(12) United States Patent
Swenson et al.

(10) Patent No.: US 7,580,409 B1
(45) Date of Patent: Aug. 25, 2009

(54) SYSTEM FOR AND METHOD OF COMMUNICATING CONTROL INFORMATION BETWEEN ENTITIES INTERCONNECTED BY BACKPLANE CONNECTIONS

(75) Inventors: Erik R. Swenson, San Jose, CA (US); Stephen R. Haddock, La Honda, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 762 days.

(21) Appl. No.: 10/658,216

(22) Filed: Sep. 8, 2003

(51) Int. Cl.
*H04L 12/28* (2006.01)
(52) U.S. Cl. ........................ 370/392; 370/400
(58) Field of Classification Search ............ None
See application file for complete search history.

(56) References Cited

U.S. PATENT DOCUMENTS

| | | | |
|---|---|---|---|
| 6,553,028 B1 * | 4/2003 | Tang et al. ............ | 370/389 |
| 6,788,671 B2 * | 9/2004 | Ryals et al. ........... | 370/351 |
| 7,031,325 B1 * | 4/2006 | Williams .............. | 370/401 |
| 7,145,869 B1 * | 12/2006 | Kadambi et al. ........ | 370/229 |
| 7,173,935 B2 * | 2/2007 | Lou et al. ............. | 370/395.5 |
| 2002/0012345 A1 * | 1/2002 | Kalkunte et al. ........ | 370/389 |
| 2003/0043736 A1 * | 3/2003 | Gonda ................ | 370/218 |
| 2003/0142685 A1 * | 7/2003 | Bare ................. | 370/410 |
| 2004/0066781 A1 * | 4/2004 | Shankar et al. ......... | 370/389 |

OTHER PUBLICATIONS

U.C. Davis, "*VLAN Information*," Oct. 29, 1998, pp. 1-13, *available at* http://net21.ucdavis.edu/newvlan.htm.
IEEE Std. 802.1D-1990, "*IEEE Standards for Local and Metropolitan Area Networks: Media Access Control (MAC) Bridges*," Mar. 8, 1991 (174 pp.).
IEEE Std 802.3ae-2002, "*IEEE Standard for Information Technology—Telecommunications and Information Exchange Between Systems—Local and Metropolitan Area Networks—Specific Requirements*," Aug. 30, 2002 (529 pp.).

* cited by examiner

*Primary Examiner*—Jayanti K Patel
*Assistant Examiner*—Jung Park
(74) *Attorney, Agent, or Firm*—Howrey LLP

(57) ABSTRACT

A system of and method for communicating control information between two or more entities over one or more backplane connections is described. The control information is stored in a layer of the packet above the physical layer and the packet is then communicated over the one or more backplane connections. A system of and method for performing load balancing over one or more backplane connections is also described. Control information for a packet is mapped into one or more identifiers of one or more of a plurality of backplane connections, and the packet is then communicated over the one or more identified backplane connections. A system of and method for extending the number of ports of a switch is further described. A first switch coupled to a second switch and having a greater number of ports than the second switch is provided. An identifier of a port of the first switch is stored in a layer of the packet above the physical layer. The packet is then communicated between the first and second switches.

93 Claims, 19 Drawing Sheets

| VLAN | Misc. | EQoS | PTI |
|---|---|---|---|

FIG. 7

| Port State | Ingress Port # | Misc. | EQoS | PTI |
|---|---|---|---|---|

FIG. 8

| VLAN | Port State | Misc. | EQoS | PTI |
|---|---|---|---|---|

FIG. 9

| Reserved | Egress Port # | Misc. | EQoS | PTI |
|---|---|---|---|---|

FIG. 10

SYSTEM FOR AND METHOD OF COMMUNICATING CONTROL INFORMATION BETWEEN ENTITIES INTERCONNECTED BY BACKPLANE CONNECTIONS

1. FIELD OF THE INVENTION

This invention relates to the field of networked systems involving entities interconnected by backplane connections, and, more specifically, to communicating packet control information through backplane communications which are subject to bandwidth limitations.

2. RELATED ART

Many network environments call for various entities, including but not limited to processors, switches, routers, gateways, asynchronous integrated circuit chips (ASICs), media access controllers (MAC), switching fabric, or the like, to be interconnected by backplane connections. A backplane connection is often found between two or more entities situated within a single chassis, but may also occur between two or more remotely situated entities not confined to a single chassis.

It is often necessary to communicate packet control information between two or more entities interconnected by a backplane connection for various tasks or functions such as packet classification, quality of service assignation, packet deletion, packet mirroring, or the like, which tasks or functions may be distributed between the two or more entities. Such communications pose significant challenges given that backplane connections are often subject to tight bandwidth constraints or limitations.

Various approaches have emerged in response to these challenges, none of which are entirely satisfactory. According to one approach, a packet pre-amble, which, for purposes of this disclosure, is a layer 1 construct in the parlance of the International Standards Organization (ISO) Open Systems Interconnection (OSI) Reference Model (even though it may technically be defined as a layer 2 construct according to some standards), is overwritten with the necessary proprietary packet control information before transmission over the backplane connection. The packet pre-amble is overwritten instead of simply augmenting the packet with the control information to allow for an in-band transmission, i.e., a transmission which occurs over the same signal lines as the packet itself without requiring additional clock cycles. After transmission of the packet over the backplane connection, the destination entity simply retrieves the necessary control information from the packet.

A limitation of this approach is that it can only be used if sufficiently tight ownership and control is maintained over the physical layer to ensure that the changes to the packet pre-amble will not disrupt or interfere with physical transmission of the packet. This condition, however, is generally not possible to meet.

In a second approach, the control information is transmitted out of band in parallel with the packets, i.e., over signal lines in parallel with and separate from those used to convey the packets. Many applications, however, impose cost and space constraints which prohibit the overhead of additional signal lines. Thus, this approach also has limited applicability.

According to a third approach, applicable in the context of Ethernet IEEE 802.3 compliant frames the format 100 of which is illustrated in FIG. 1, the inter-frame gap (IFG) 102 is shrunk to less than the 12 byte minimum required by IEEE, and the saved bandwidth used for communicating in-band the control information. However, as a practical matter, for a 10 Gb/s Ethernet, the IFG can only be reduced below 12 bytes by a maximum of 4 bytes. So, this approach only allows for in-band transmission of a very limited amount of proprietary control information, i.e., up to 4 bytes. This is insufficient for all but the most limited applications.

SUMMARY

In a first aspect of this disclosure, a system for communicating control information over one or more backplane connections between two or more entities is described. In this system, first logic stores the control information within a layer of a packet above the physical layer. In one embodiment, the control information overwrites at least a portion of one or more pre-existing fields, such as Ethertype, in the MAC sub-layer of the packet such that the control information can be communicated in-band over the one or more backplane connections. Second logic then communicates the packet over one or more of the backplane connections.

In a second aspect of this disclosure, a system for performing load balancing of packets over a plurality of backplane connections between two or more entities is described. In this system, first logic maps control information for a packet into one or more identifiers of one or more of the plurality of backplane connections. Second logic then communicates the packet over the identified one or more backplane connections.

In one embodiment, the two or more entities comprise a switch, and a translation or look-up table (collectively referred to as a LUT) stores an association between ingress or egress ports of the switch and the backplane connections. In one implementation, the association is pre-determined to achieve a desired load balancing of packets over the plurality of backplane connections. The first logic derives from the control information for the packet an identifier of an ingress port of the switch at which a packet was received over a network or an egress port of the switch at which the packet will or is expected to be transmitted over a network, and maps the ingress or egress port identifier into one or more backplane connections using the LUT. The second logic then communicates the packet over the identified one or more backplane connections.

In a third aspect of this disclosure, a system for extending the number of ports of a switch is described. In this system, a first switch coupled to a second switch and having a greater number of ports than the second switch is provided. First logic stores in a layer of a packet above the physical layer an identifier of a port of the first switch. Second logic then communicates the packet between the first and second switches. In one implementation, the first logic stores in the packet an identifier of an ingress port of the first switch at which the packet was received over a network, and communicates the packet to the second switch. In a second implementation, the first logic stores in the packet an identifier of an egress port at which the packet will or is expected to be transmitted from the first switch over a network. In one example, the ingress or egress port identifier is stored in the MAC sub-layer of the packet in the form of one or more pre-existing fields comprising a VLAN.

Other systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 7 illustrates one embodiment of the format of a packet header as the packet flows from a network side MAC to the switching fabric in the I/O blade of FIG. 3.

FIG. 8 illustrates one embodiment of the format of a packet header as the packet flows from the switching fabric to a backplane side MAC in the I/O blade of FIG. 3.

FIG. 9 illustrates one embodiment of the format of a packet header as the packet flows from a backplane side MAC to a packet filtering and classification engine (PFC) in the MSM blade of FIG. 4.

FIG. 10 illustrates one embodiment of the format of a packet header as the packet flows from a PFC to the switching fabric in the MSM blade of FIG. 4.

DETAILED DESCRIPTION

Figure 1:
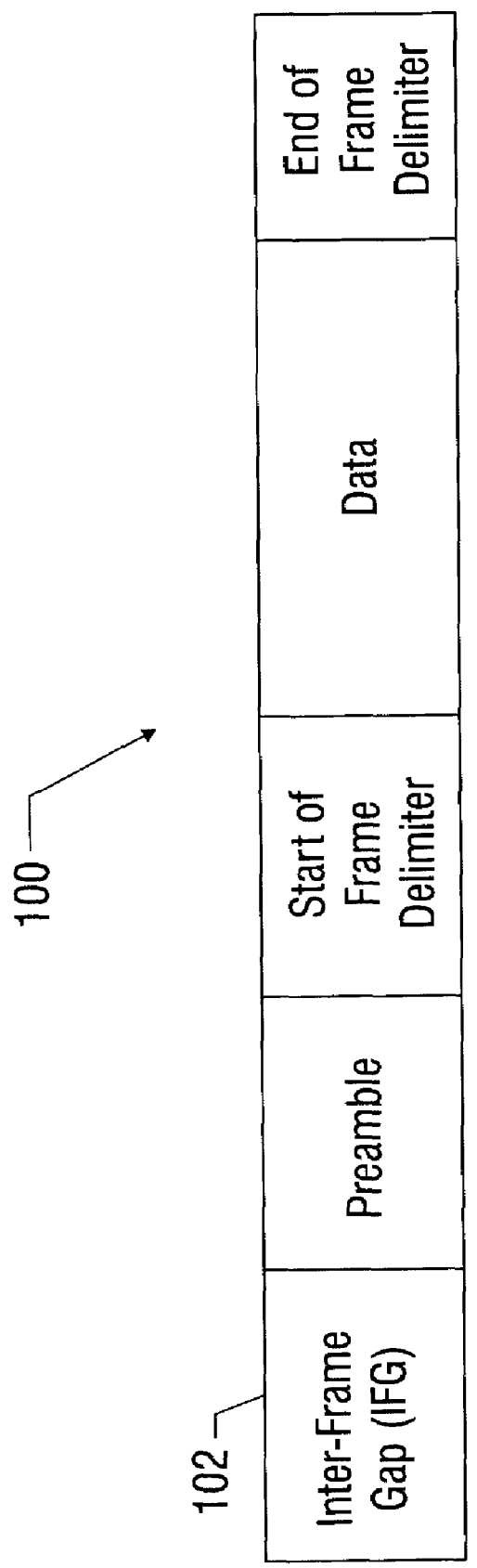
FIG. 1 illustrates one embodiment of the format of an IEEE 802.3 compliant Ethernet frame.

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

The term "logic" refers to implementations in hardware, software, or combinations of hardware and software.

The term "packet" means (1) a group of binary digits including data and control elements which is switched and transmitted as a composite whole, wherein the data and control elements and possibly error control information are arranged in a specified format; (2) a block of information that is transmitted within a single transfer operation; (3) a collection of symbols that contains addressing information and possibly error detection or correction information; (4) a sequence of characters with a specific order and format, such as destination followed by a payload; (5) a grouping of data of some finite size that is transmitted as a unit; (6) a frame; (7) the logical organization of control and data fields defined for any of the layers or sub-layers of an applicable reference model, including the OSI or TCP/IP reference models, e.g., MAC sub-layer; or (8) a unit of transmission for any of the layers or sub-layers of an applicable reference model, including the OSI or TCP/IP reference models.

The term "layer two of the OSI reference model" includes the MAC sub-layer.

The term "port" refers to any point of ingress or egress to or from a switch or other entity, including any port channel or sub-channel, or any channel or sub-channel of a bus coupled to the port.

The term "backplane connection" means (1) any connection between two or more entities which does not function as a user interface; (2) a printed circuit board that contains connectors and/or interconnect traces; (3) a printed circuit board on which connectors are mounted, and into which boards or plug-in units are inserted; (4) a circuit board with one or more bus connectors that provides signals for communication between bus modules, and provides certain resources to the connected modules; (5) a circuit board with one or more bus connectors used to interconnect modules together electrically; (6) a subassembly that holds connectors into which one or more boards can be plugged; (7) a motherboard comprising connectors for the modules of a system and wiring interconnecting those modules; (8) the main circuit board of a computer into which other circuit boards are plugged; or (9) an electronic and/or fiber optic interconnected set of connectors used to connect modules together electrically and/or optically.

Example Environment

Figure 2:
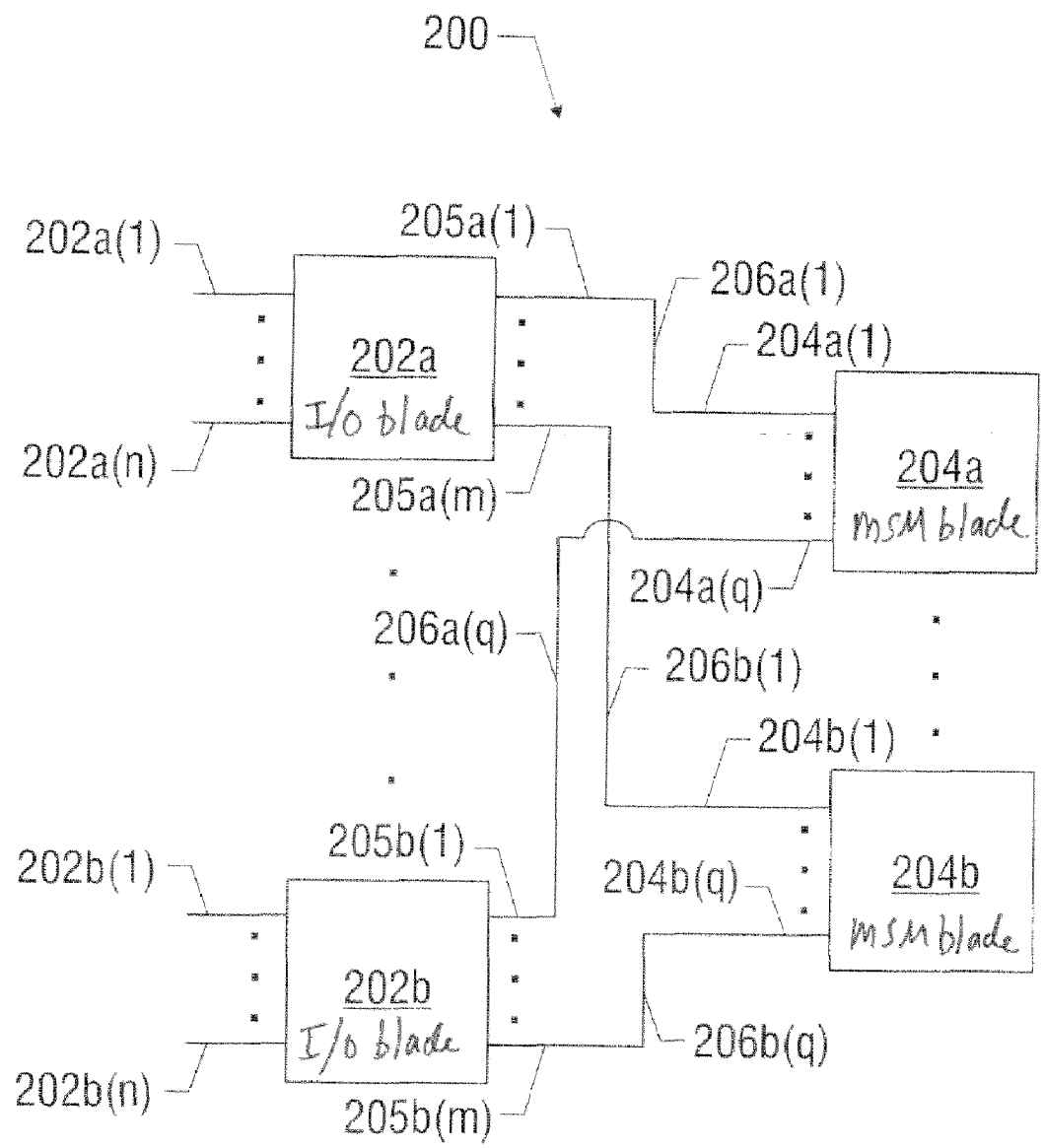
FIG. 2 is a block diagram of one embodiment of a switch comprising a plurality of I/O blades and management/switching (MSM) blades.

FIG. 2 illustrates an example environment in which the invention may be employed. The following description of this example environment is being provided to provide context for the invention and promote understanding of the invention. However, many other examples are possible so nothing in FIG. 2 or the description thereof should be taken as limiting.

FIG. 2 illustrates a switch 200 comprising one or more I/O blades 202a, 202b interconnected with one or more management/switching (MSM) blades 204a, 204b. Each I/O blade is configured with n network side ingress or egress ports, where n is an integer of 1 or more, and m backplane side ingress or egress ports, where m is an integer of 1 or more. The n network side ingress or egress ports for I/O blade 202a are identified with numerals 202a(1) to 202a(n), and those for I/O blade 202b with numerals 202b(1) to 202b(n). The m backplane side ingress or egress ports for I/O blade 204a are identified with numerals 205a(1) to 205a(m), and those for I/O blade 204b with numerals 205b(1) to 205b(m). The number n of network side ingress or egress ports may be the same as or different from m, the number of backplane side ingress or egress ports.

Each MSM blade is configured with q backplane side ingress or egress ports, where q may be the same or different from p, the number of I/O blades that are present. The q backplane side ingress or egress ports for MSM blade 204a are identified with numerals 204a(1) to 204a(q), and those for MSM blade 204b with numerals 204b(1) to 204b(q). Each MSM blade is coupled to the I/O blades through q backplane connections, one or more for each of the I/O blades. The backplane connections coupling MSM blade 204a to the I/O blades are identified with numerals 206a(1) to 206a(q), and the backplane connections coupling MSM blade 204b to the I/O blades are identified with numerals 206b(1) to 206b(q). Backplane connector 206a(1) couples port 204a(1) of MSM blade 204a to port 205a(1) of I/O blade 202a, and backplane connector 206a(q) couples port 204a(q) of MSM blade 204a to port 205b(1) of port 202b. Backplane connector 206b(1) couples port 204(b)(1) of MSM blade 204b to port 205a(m) of I/O blade 202a, and backplane connector 206b(q) couples port 204b(q) of MSM blade 204b to port 205b(m) of I/O blade 202b.

Backplane connector 206a(1) allows any port 202a(1) to 202a(n) of I/O blade 202a access to any of ports 204a(1) to 204a(q) of MSM blade 204a, and backplane connector 206a(q) allows any port 202b(1) to 202b(n) of I/O blade 202b access to any of ports 204a(1) to 204a(q) of MSM blade 204a. Similarly, backplane connector 206b(1) allows any port 202a(1) to 202a(n) of I/O blade 202a access to any of ports 204b(1) to 204b(q) of MSM blade 204b, and backplane connector 206b(q) allows any of ports 202b(1) to 202b(n) of I/O blade 202b access to any of ports 204b(1) to 204b(q) of MSM blade 204b. Each of the backplane connections is assumed to be bi-directional, but it should be appreciated that examples are possible where all or some of the connections are uni-directional.

The number of MSM blades which are present, m, is not necessarily equal to the number p of I/O blades which are present. In one implementation, the switch 200 comprises 8 I/O blades and 2 MSM blades. In this implementation, each I/O blade is configured with 6 network side ingress or egress ports and 2 backplane side ingress or egress ports. Each MSM blade is configured with 8 backplane side ingress or egress ports. Each MSM blade is coupled to the I/O blades with 8 backplane connections, one for each of the I/O blades. Each of the n network side ports of an I/O blade in this implementation may be configured either as a single 10 GB port or 10 1 GB Ethernet ports, and each of the backplane ports of the I/O blade in this implementation is configured as a 10 GB Ethernet port. Each of the backplane ports of an MSM blade in this implementation is configured as a 10 GB Ethernet port.

Figure 3:
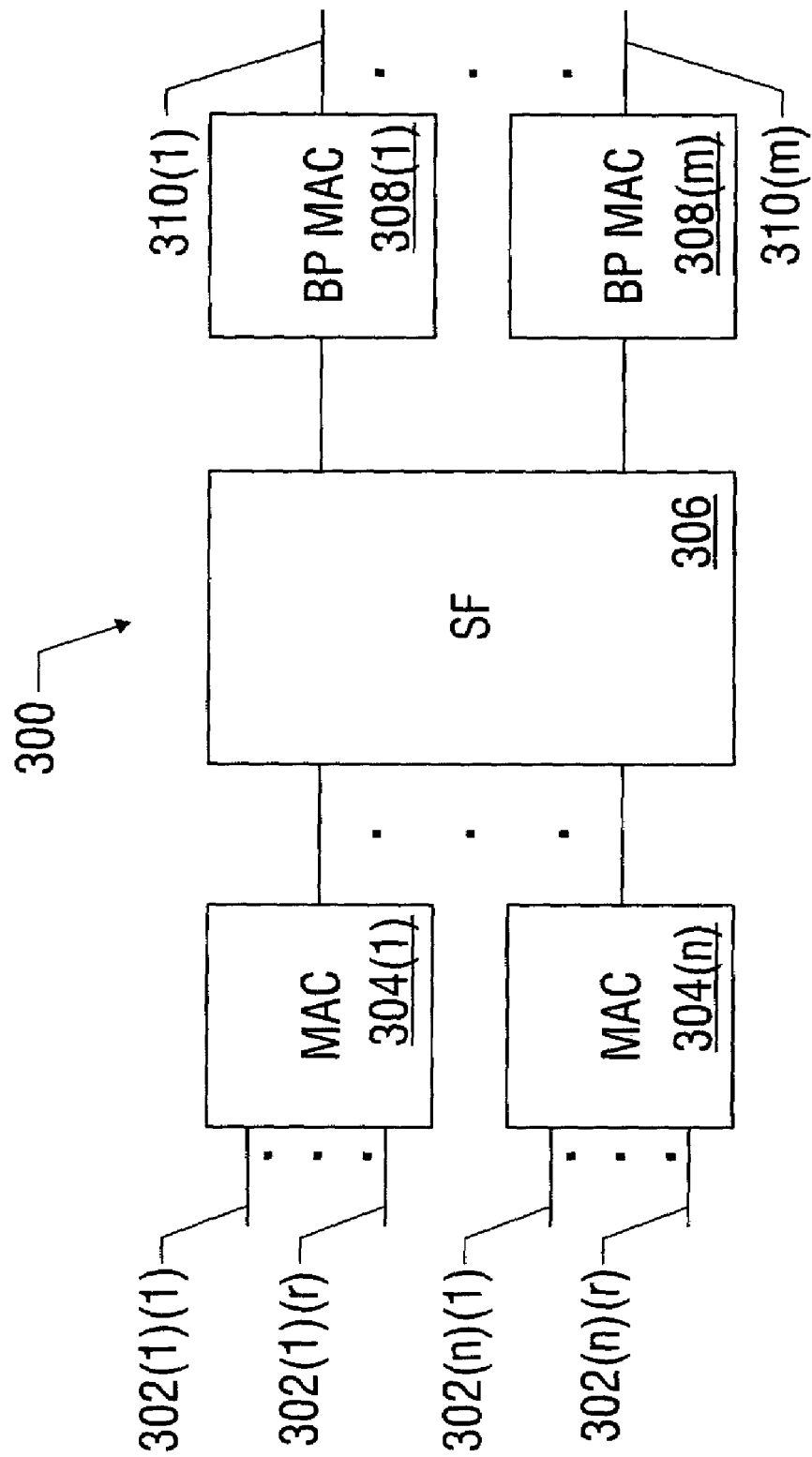
FIG. 3 is a block diagram of one embodiment of an I/O blade in the switch of FIG. 2.

FIG. 3 is a block diagram of one implementation of an I/O blade 300 in the switch 200 of FIG. 2. As illustrated, in this implementation, the I/O blade comprises n network side MAC controllers, identified with numerals 304(1) to 304(n). Each of the n network side MAC controllers 304(1) to 304(n) has r network side connections. The network side connections for MAC controller 304(1) are identified with numerals 302(1)(1) to 302(1)(r) and the network side connections for MAC controller 304(m) are identified with numerals 302(n)(1) to 302(n)(r). In the case in which each network side port of the I/O blade illustrated in FIG. 3 is a single 10 GB port, the number r in FIG. 3 is equal to 1. In the case in which each network side port of the I/O blade illustrated in FIG. 3 comprises 10 1 GB ports, the number r in FIG. 3 is equal to 10. Each of the n network side MAC controllers is coupled to switching fabric 306. The switching fabric 306 in turn is coupled to each of m backplane MAC controllers, identified with numerals 308(1) to 308(m), one for each of the backplane side ingress or egress ports, identified with numerals 310(1) to 310(m). In one implementation example, each of the MAC controllers and the switching fabric in the I/O blade is implemented as an ASIC.

Figure 4:
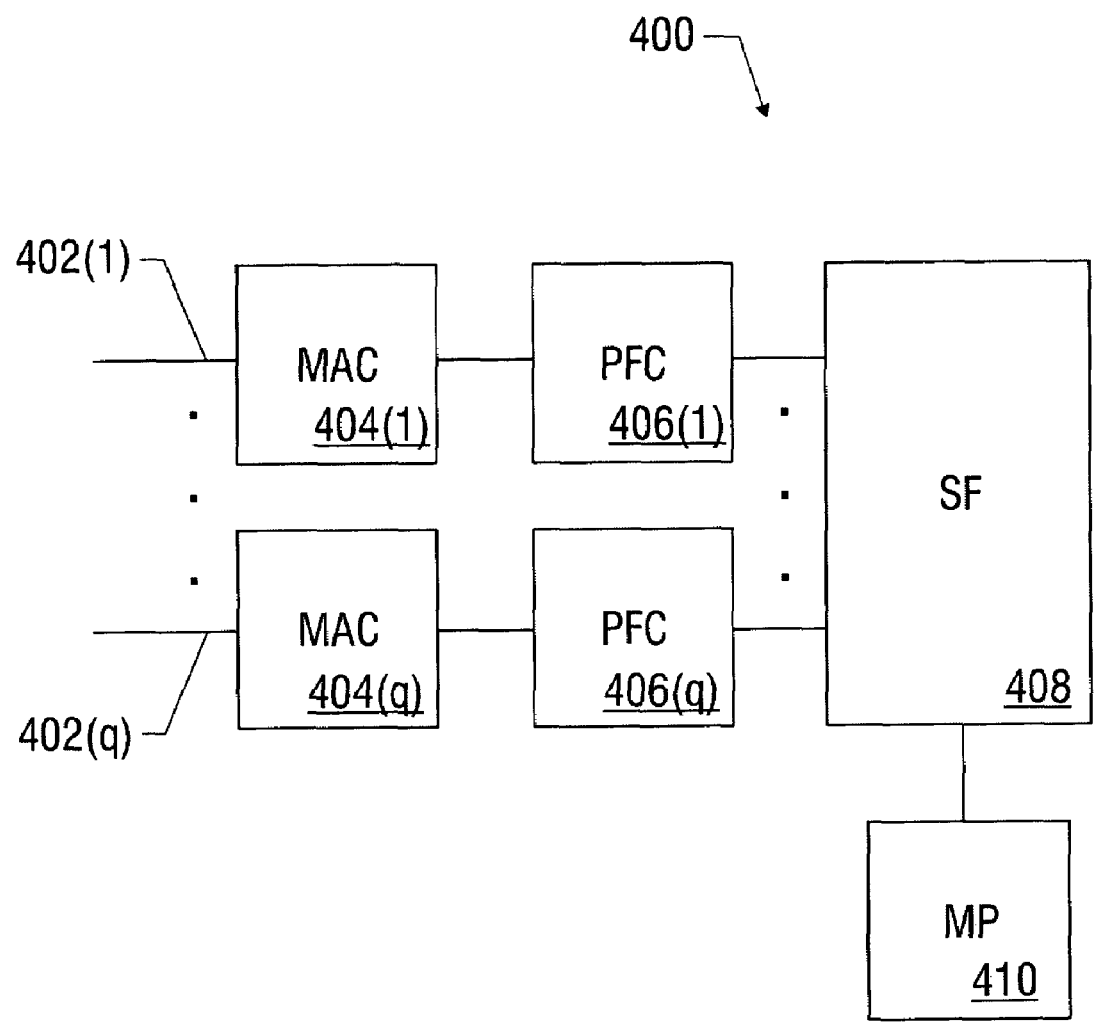
FIG. 4 is a block diagram of one embodiment of an MSM blade in the switch of FIG. 2.

FIG. 4 is a block diagram of one implementation of an MSM blade 400 in the switch 200 of FIG. 2. As illustrated, in this implementation, the MSM blade comprises q backplane side MAC controllers, identified with numerals 404(1) to 404(q), one for each of the backplane side ingress or egress ports, identified with numerals 402(1) to 402(q), of the MSM blade 400. Each of the q backplane side MAC controllers is coupled to a packet filtering and control engine (PFC), identified with numerals 406(1) to 406(q). Each of the PFC engines in turn is coupled to switching fabric 408. The switching fabric 408 is coupled to microprocessor controller 410. In one implementation example, each of the MAC controllers and the switching fabric in the MSM blade is implemented as an ASIC.

Figure 5:
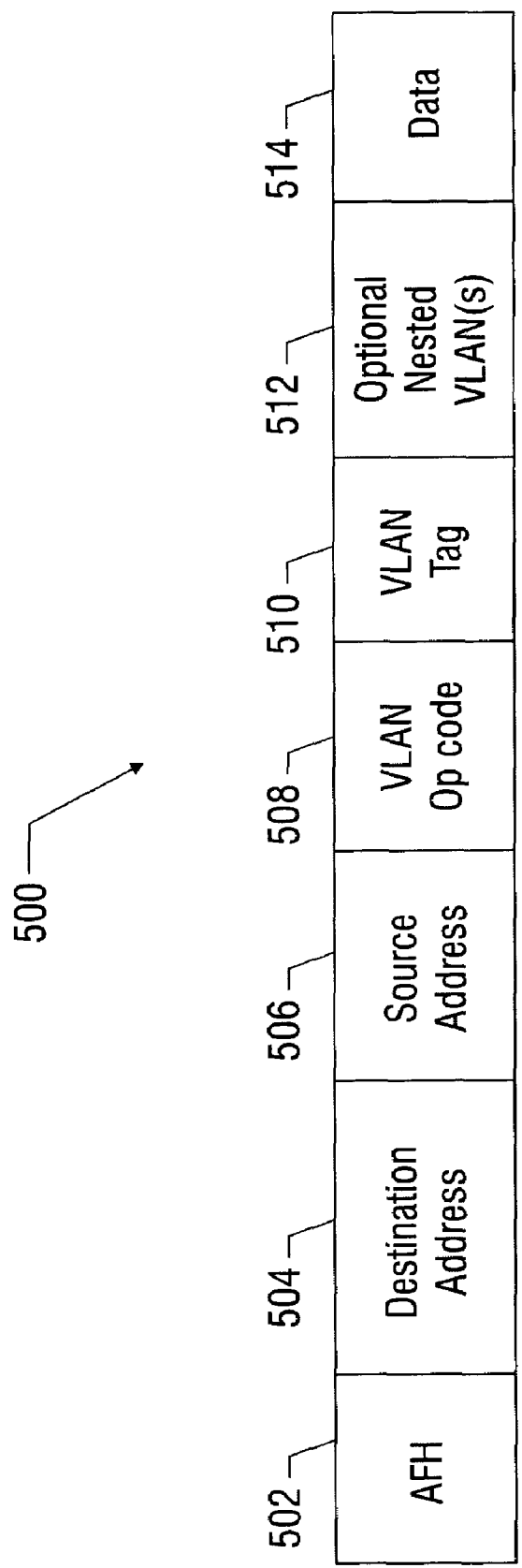
FIG. 5 illustrates one embodiment of the format of a packet configured for routing over the switching fabric of either the I/O blade of FIG. 3 or the MSM blade of FIG. 4.

FIG. 1 illustrates the layer one (physical layer) format of a packet received at the switch 200. FIG. 5 illustrates the layer two (data link layer and/or MAC sub-layer) format of the packet as it flows through the switch 200. This layer two format may be encapsulated by the layer one information of FIG. 1 or this layer one information may be stripped off the packet as it flows through the switch 200.

The AFH field is an address filter header added to the packet by the network side MAC controller at the ingress port of the I/O blade in the switch 200 at which the packet was received over a network. This header functions as a placeholder for proprietary packet control information as the packet is routed through the switch 200. In one implementation, the AFH field is 8 bytes.

Field 504 is the layer two destination address, and field 506 is the layer two source address. In one implementation, these fields remain static as the packet is routed through the switch 200 as the internal components of the switch 200 are not recognized layer two entities. In another implementation, the internal components of the switch 200 are recognized layer two entities, and these fields therefore change at the packet is routed through the switch 200. In one implementation, the destination and source address fields are each 6 bytes.

Fields 508 and 510 together comprise a virtual LAN (VLAN), an IEEE 802.1 construct which allows physically separate devices to be grouped together logically into a single broadcast domain. Field 508 is the VLAN op code field, and field 510 is the VLAN tag field. (For purposes of this disclosure, the VLAN op code field is the IEEE 802.1 compliant Ethertype field, and the VLAN tag field is the IEEE 802.1 compliant tag control information (TCI) field). The VLAN comprising fields 508 and 510 may be the outer VLAN of a plurality of nested VLANs. If a nested VLAN is present, the other VLANs in this nested grouping of VLANs is identified with numeral 512. In one implementation, the VLAN op code and tag fields are each 2 bytes, and each VLAN comprises 4 bytes.

Field 514 is a variable length data field and comprises the packet payload as well as higher packet protocol layers than layer two.

Figure 6:
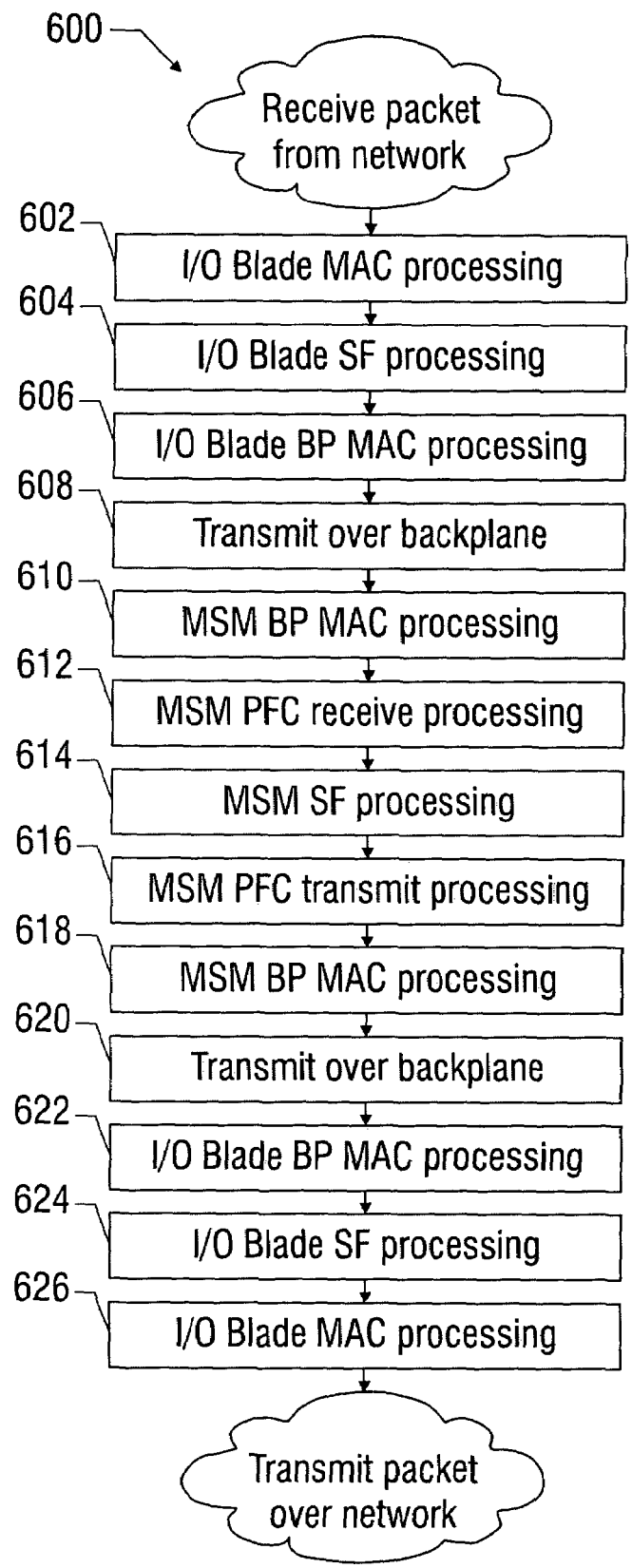
FIG. 6 is a flowchart of one embodiment of the packet processing steps which take place as a packet flows through the switch of FIG. 2.

FIG. 6 is a flowchart of one embodiment of a method 600 of processing a packet as the packet flows through the various components of the switch 200. As illustrated, when a packet is received by the switch from a network, the packet undergoes processing by the network side MAC controller associated with the ingress port of the I/O blade which received the packet. This processing is identified with numeral 602 in the figure.

In one implementation, the MAC controller inserts an element, which may be referred to as a door ID (DID), in layer two or the MAC sub-layer of the packet. In example, this DID is located after the source address field 506 illustrated in FIG. 5. In addition, if the packet was received without a VLAN, the MAC controller inserts a VLAN in layer two or the MAC sub-layer of the packet after the DID element. In one example, the DID comprises an op code portion and a tag portion, and the VLAN also comprises an op code portion and a tag portion. The op code portions of the DID and VLAN may be the same or different. In one example, they are the same so that third party devices recognize the inserted DID as a VLAN.

The MAC controller then encodes the VLAN state into the DID. The VLAN state is an indicator of whether the packet was received at the switch with a VLAN, or whether a VLAN was inserted at the switch because the packet was received without one. As will be discussed further on in this disclosure, this information is utilized to implement ingress mirroring.

The MAC controller also pre-pends the AFH header to the packet. As previously stated, the AFH is a placeholder for packet control information as the packet flows through the switch 200. In one implementation, the AFH holds proprietary control information for the packet, i.e., control information proprietary to the switch 200, but it should be appreciated that examples are possible where the control information is recognized by other network entities besides switch 200. In one example, the AFH is an 8-byte field.

The MAC also inserts Port Tag Index (PTI), Egress Quality of Service (EQoS), and VLAN values into the AFH. The PTI is an identifier of the ingress port (or port channel or sub-channel) over which the packet was received at the switch 200. The VLAN is the outermost VLAN present in or inserted into the packet. The EQoS is a quality of service indicator for the packet, and may be used to determine the priority of the queue used to buffer the packet before transmission over a backplane connection to the MSM blade.

In one implementation, the EQoS is derived from the VLAN in the packet using a known association between possible values of the VLAN and values of EQoS. In one example, the association is embodied as a lookup table associating various values of the VLAN with various EQoS values. In this example, a lookup table access determines the EQoS value associated with the specific VLAN in the packet. Alternatively, the EQoS may be derived directly from virtual priority (VPRI) bits in the VLAN. FIG. 7 illustrates one embodiment of the format of the AFH header after these values have been inserted.

The packet is then transmitted to the switching fabric of the I/O blade, and the processing identified with numeral 604 in FIG. 6 is performed. In one embodiment, the switching fabric forms a virtual port number from the combination of 1) the PTI value for the packet (which in this particular embodiment is representative of the sub-channel over which the packet was received at the switch 200); 2) an identifier of the ingress port over which the packet was received at the switch 200; and 3) the VLAN inserted into or present in the packet. The switching fabric then accesses a known association between virtual port numbers and port states to determine a port state associated with the virtual port number. In one implementation, this known association is maintained in an external translation or lookup table (collectively referred to as LUT) accessible to the switching fabric. The switching fabric determines the port state associated with the virtual port number through an access to this LUT using the virtual port number as an index. The port state is an indicator of additional processing that will take place on the packet in the MSM blade, such as ingress mirroring or packet kill functions.

The switching fabric then determines the one or more I/O blade output ports over which the packet will or is expected to be transmitted to one of the MSM blades. In one embodiment, the packet is transmitted to one of the MSM blades through a single output port, and the switching fabric identifies this output port using a known association between PTI values and output port identifiers which is maintained. Using this known association, the switching fabric maps the PTI value for the packet into an output port identifier. In one implementation, this association is pre-determined and implemented as a LUT that embodies a desired load balancing of packets over the one or more backplane connections interconnecting the I/O and MSM blades. Through a single access to the LUT using the PTI value of the packet as an index, the associated output port identifier is determined.

The switching fabric then stores the ingress port identifier for the packet and the port state into the AFH header of the packet. FIG. 8 illustrates one embodiment of the format of the AFH packet header after these values have been inserted. The switching fabric then stores the packet in a queue associated with the previously determined output port of the I/O blade. This queue is selected from a plurality of possible queues, each corresponding to different qualities of service or priorities. It determines the queue associated with the output port based on the EQoS value associated with the packet.

When the packet is de-queued, the processing identified with numeral 606 in FIG. 6 is then performed. In this step, the backplane MAC inserts relevant control information from the AFH packet header into the DID previously inserted into the packet, and then deletes the AFH header. The information from the AFH which is retained in the DID is that which is needed to support additional processing at the MSM blade after transmission over a backplane connection. This process will be described in greater detail farther on in this disclosure.

Step 608 of FIG. 6 is then performed. In this step, the packet is transmitted over one or more backplane connections to one or more MSM blades. In one implementation, the packet is transmitted over one of two possible backplane connections to one of two possible MSM blades.

Figure 14:
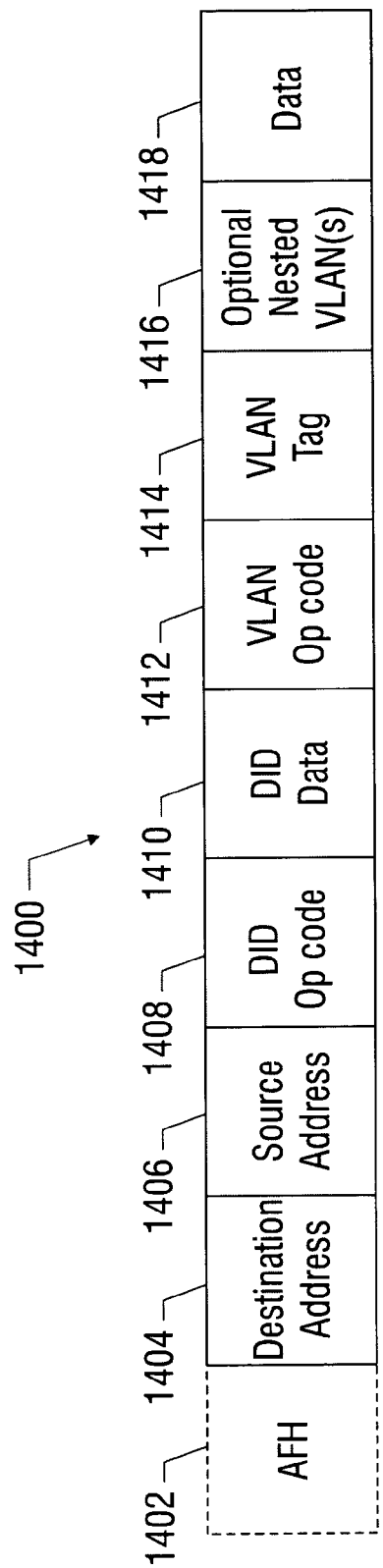
FIG. 14 illustrates one embodiment of the format of a packet for carrying packet control information over a backplane connection in the form of one or more DID fields.
Figure 15:
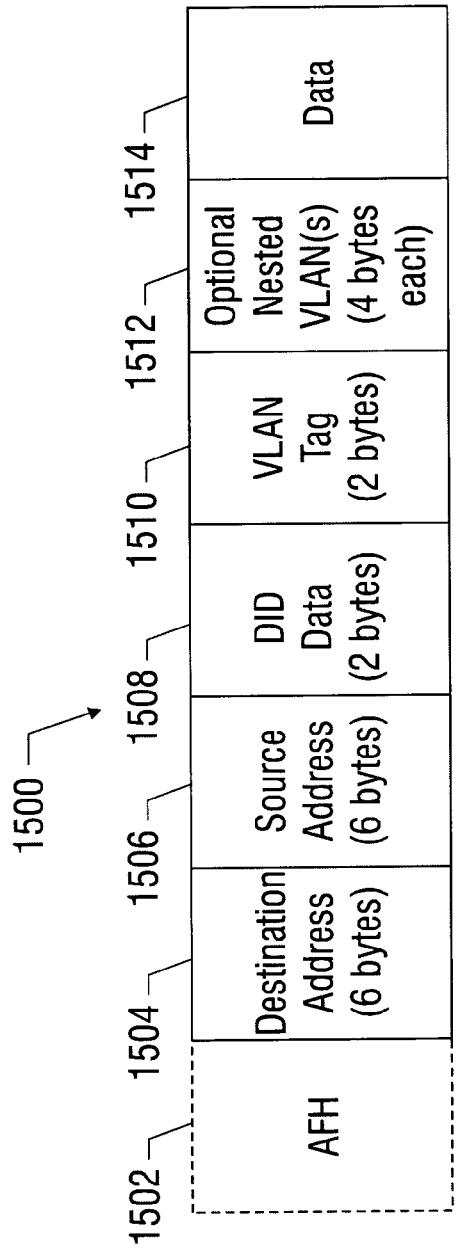
FIG. 15 illustrates a second embodiment of the format of a packet for carrying packet control information over a backplane connection in the form of one or more DID fields.

One embodiment of the format of a packet during transmission over the backplane connection is illustrated in FIG. 14. The AFH header, identified with numeral 1402, is shown in phantom since relevant information from this field is encoded into the packet, and then this field is deleted before transmission of the packet over the backplane connection. A second embodiment of the format of a packet during transmission over a backplane connection is illustrated in FIG. 15. The AFH header, identified with numeral 1502, is again shown in phantom since relevant information from this field is again encoded into the packet, and this field then deleted before transmission of the packet over the backplane connection.

Turning back to FIG. 6, the processing identified with numeral 610 is then performed in the backplane MAC controller of the ingress port of the MSM blade at which the packet is received. In one embodiment, this processing comprises pre-pending an AFH header to the packet, deriving relevant control information from the DID, and then inserting this information into the AFH header of the packet. FIG. 9 illustrates one embodiment of the format of the AFH after this information has been inserted.

The packet is then transferred to the packet filtering and classification engine (PFC) coupled to the MSM backplane MAC controller which performed the processing of step 610. The PFC then performs the processing identified with numeral 612 in FIG. 6. The PFC performs designated receive processing tasks in relation to the packet, including packet classification, and functions implied by the port state.

In one example, the port state indicates ingress mirroring, which means that a copy of the packet as received at the switch 200 is sent to a mirror port. The VLAN state bits, referred to previously, are used in this process to delete from the mirrored packet any VLAN inserted by the I/O blade, so that the packet is a faithful copy of what was received at the switch 200. In another example, the port state indicates that the packet is to be killed, i.e., not forwarded beyond the PFC engine.

The packet is then transferred to the switching fabric of the MSM blade. The processing identified with numeral 614 in FIG. 6 is then performed. In one embodiment, this processing comprises multicasting, determining the egress port of the packet at which the packet will or is expected to be transmitted from the switch 200 over a network. This processing may also include using the ingress port number to implement an echo kill function, and using the ingress port number in conjunction with the egress port numbers to implement load balancing.

The switching fabric then routes the packet to the MSM egress port associated with the identified egress I/O blade. (If multicasting is desired, the packet may be transferred to a plurality of the MSM output ports.) The packet is transferred to the PFC engine associated with the MSM egress port, and the processing identified with numeral 616 in FIG. 6 is performed. The PFC performs various transmit modifications to the packet, and transfers the packet to the MSM backplane MAC controller coupled to the PFC engine. FIG. 10 illustrates one embodiment of the format of the AFH header at this juncture.

At the MSM backplane MAC controller, the processing identified with numeral 618 in FIG. 6 is performed. The MAC controller copies control information from the AFH header to the DID previously inserted into the packet at the MAC sublayer after the MAC destination address field. This process is described in more detail later on in this disclosure. The MAC controller then deletes the AFH header, and transmits the packet over one or more backplane connections to the egress I/O blade. The step of transmitting the packet over the backplane is identified with numeral 620 in FIG. 6.

The packet is received by the backplane MAC controller for the identified egress I/O blade and the processing identified with numeral 622 in FIG. 6 is performed. In this processing, the backplane MAC pre-pends an AFH header to the packet, and inserts in this header control information derived from the DID of the packet. In one embodiment, the MAC copies the VLAN delete, QoS select, and egress port number from the DID into the AFH. In addition, a drop priority flag is copied from the DID into the AFH header, and the outer VLAN of the packet is copied into the VLAN field of the AFH header. The drop priority flag is an indicator of whether or not the packet is a candidate for dropping. The MAC controller also stores a PTI value into the AFH header which is representative of this egress port and the state of the VLAN delete flag.

The packet is then directed to the switch fabric for the I/O blade and the processing identified with numeral 624 in FIG. 6 is performed. The switching fabric stores the packet in a queue associated with the egress port represented by the PTI value for the packet. This queue is selected based on the QoS value for the packet. If the drop priority bit indicates that the packet is to be killed, and the queue is in a congested state, the packet is not placed on the queue. When the packet is dequeued, the packet is transferred to the network side MAC controller for the designated egress port. The processing identified with numeral 626 in FIG. 6 is then performed. In this processing, the DID is stripped from the packet. In addition, the outer VLAN may also be stripped based on the VLAN delete bit. The packet is then forwarded over the network through the designated egress port and subchannel.

Embodiments of the Invention

Figure 11:
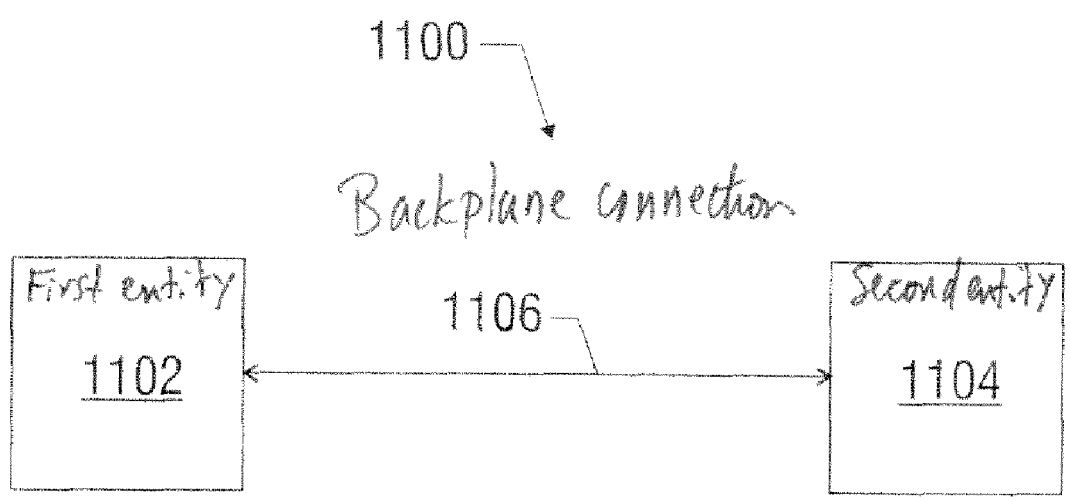
FIG. 11 is a block diagram representing two or more entities interconnected by one or more backplane connections.

FIG. 11 is a block diagram of a system 1100 for communicating control information between two or more entities, identified with numerals 1102 and 1104, through one or more backplane connections, identified with numeral 1106. In one embodiment, first logic stores the control information within a layer of a packet above the physical layer, and second logic then communicates the packet over the one or more backplane connections 1106.

The first logic may store the control information in at least a portion of one or more fields inserted into the packet by the first logic. Alternatively or in addition, the first logic may overwrite at least a portion of one or more pre-existing fields in the packet with the control information.

The two or more entities may comprise a switch, and the control information may be proprietary to the switch. The switch may have ingress and egress ports. The proprietary control information may comprise an identifier of an ingress port of the switch at which the packet was received over a network, or an identifier of an egress port of the switch at which the packet will or is expected to be transmitted over a network.

The proprietary control information may also comprise an indicator of whether or not one or more predetermined fields were present in the packet upon receipt thereof at the switch. In one implementation, the one or more predetermined fields comprise a VLAN.

In one embodiment, the control information is stored in layer two or higher of the packet according to the OSI reference model. In a second embodiment, the control information is stored in layer two of the packet according to the OSI reference model. In one implementation, the control information is stored in the MAC sub-layer of the packet.

In one implementation example, the control information overwrites at least a portion of a VLAN stored in the MAC sub-layer of the packet. In a second implementation example, the control information overwrites at least a portion of source or destination addresses stored in the MAC sub-layer of the packet.

The VLAN may comprise op code and tag portions. In one example, the first logic overwrites the op code portion of the VLAN with the control information after updating the control information to include an identifier of the VLAN op code overwritten by the control information. The VLAN may be the outer VLAN of a plurality of nested VLANs.

The control information may comprise quality of service information for the packet. This quality of service information may comprise an identifier of a queue for buffering the packet. The control information may also comprise an indicator that the packet is a candidate for dropping.

In one embodiment, the control information is communicated in-band over the one or more backplane connections. To achieve this objective, a sufficient portion of the packet may be dropped to allow the control information to be added to the packet, and the packet communicated over the one or more backplane connections without requiring additional clock cycles.

In a second embodiment, the first logic derives at least a portion of the control information from a packet header, and deletes the packet header prior to communication of the packet over the one or more backplane connections. In this embodiment, third logic may be provided for re-creating at least a portion of the packet header from the control information after communication of the packet over the one or more backplane connections.

In one implementation, the first logic inserts a 4 byte DID into the MAC sub-layer of an Ethernet packet after the MAC source address field, and stores the control information in the 4 byte DID. The second logic then communicates the packet between the two or more entities over the one or more backplane connections.

In this implementation, the DID comprises a 2 byte op code portion and a 2 byte data portion, and the control information is inserted into the 2 byte data portion. The op code portion of the DID can take on any value, and may be the same as or different from the op code portion of a VLAN situated to the right of the DID at the MAC sub-layer. If a nested VLAN is situated to the right of the DID, the op code portion of the DID may be the same as or different from the op code portion of the outer VLAN in the nested group of VLANs. In one implementation, the op code portion of the DID is set to the VLAN op code so that third party devices will recognize the DID as a VLAN.

Figure 12:
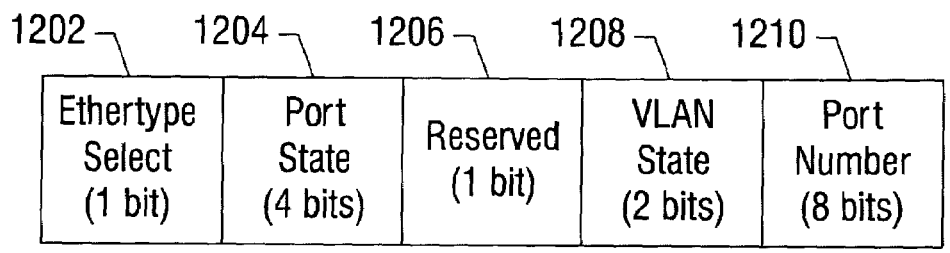
FIG. 12 illustrates one embodiment of the format of packet control information configured for passage over a backplane connection in the form of one or more door ID fields.

In one example, for transmission from an I/O blade to an MSM blade over one or more backplane connections in the previously discussed example environment, the data portion of the DID with the control information inserted has the format illustrated in FIG. 12. In this example, field 1202 is an Ethertype Select bit which indicates which of two possible values the op code portion of the VLAN is set to. Field 1204 is a 4 bit port state value indicating the state of an ingress port of the switch. Examples of port states and the functions implied thereby were explained previously in the previous example environment section. Field 1206 is 1 bit reserved field. Field 1208 is a 2 bit value indicating one of three VLAN states: no VLAN was present when the packet was received by the switch, the VLAN was present and was equal to zero, or the VLAN was present and not equal to zero. As explained previously, this field is used to implement ingress mirroring. Field 1210 is an 8 bit value indicating the ingress port at which the packet was received at the switch.

Figure 13:
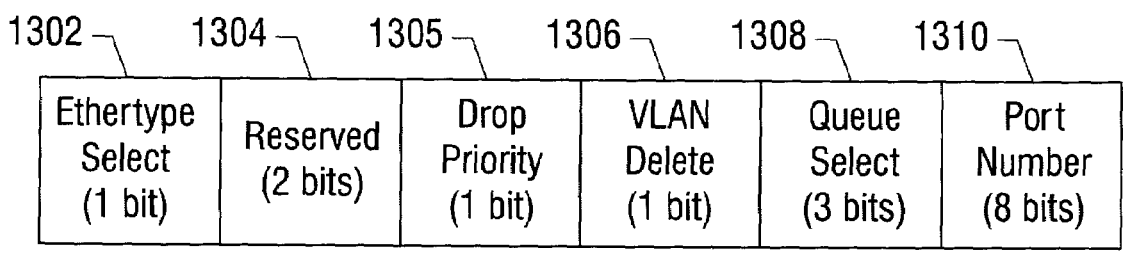
FIG. 13 illustrates a second embodiment of the format of packet control information configured for passage over a backplane connection in the form of one or more door ID fields.

In a second example, for transmission from an MSM blade to an I/O blade over one or more backplane connections in the previously discussed example environment, the data portion of the DID with the control information inserted has the format illustrated in FIG. 13. In this example, field 1302 is again an Ethertype Select bit which indicates which of two possible values the op code portion of the VLAN is set to. Field 1304 is a 2 bit reserved field. Field 1305 is a 1 bit drop priority flag which is used to indicate whether or not the packet is a candidate for dropping if, for example, traffic through the network is at or above its designated bandwidth. Field 1306 is a 1 bit field used to indicate that the VLAN should be deleted when the packet leaves the egress port. Field 1308 is a 3 bit queue select/quality of service indicator. Field 1310 is an 8 bit value indicating the egress port through which the packet will or is expected to be transmitted over the network.

In one example, the control information which is inserted into the data portion of the DID is derived at least in part from an 8 byte AFH header pre-pended to the packet in the MAC layer. Before communication of the packet over the backplane connection, and after insertion of the relevant control information into the DID, the AFH header is deleted in this example. After communication of the packet over the backplane connection, third logic may be provided which re-creates the AFH header at least in part from the control information stored in the data portion of the DID.

Various modes of operation may be supported in this example. In a first mode of operation, the packet with the DID/control information inserted has the format illustrated in FIG. 14. Field 1402 is an 8 byte AFH header shown in phantom since it is deleted from the packet before communication thereof over the backplane connection. Field 1404 is a 6 byte MAC sub-layer destination address. Field 1406 is a 6 byte MAC sub-layer source address. Field 1408 is the 2 byte DID op code. Field 1410 is the 2 byte DID data portion. Field 1412 is the 2 byte VLAN op code. Field 1414 is the 2 byte VLAN tag portion. If nested VLANs, are present, the VLAN comprising fields 1412 and 1414 is the outer VLAN, and the additional one or more VLANs are stored in field 1416. Field 1418 is the data or payload portion of the packet.

In a second mode of operation, the packet with the DID/control information inserted has the format illustrated in FIG. 15. Field 1502 is the 8 byte AFH header, again shown in phantom since it is deleted from the packet before communication thereof over the backplane connection. Field 1504 is a 6 byte MAC sub-layer destination address. Field 1506 is a 6 byte MAC sub-layer source address. Field 1508 is the 2 byte DID data portion. Field 1510 is the 2 byte VLAN tag portion. If nested VLANs, are present, the VLAN represented by field 510 is the outer VLAN, and the additional one or more VLANs are stored in field 1512. Field 1514 is the data or payload portion of the packet.

Comparing FIG. 15 with FIG. 14, it will be observed that the DID op code and VLAN op code fields present in FIG. 14 are deleted in FIG. 15. That is because in FIG. 15, the DID Ethertype is a dummy value, and the Ethertype Select bit indicates which of two possible values the op code portion of the VLAN is set to. After the packet has been communicated over the backplane, this bit may then be utilized to recreate the VLAN op code field. In any event, in FIG. 15, the storage of the control information in the packet does not result in any net increase in packet size over that needed to convey the VLAN. In effect, the control information stored in the 2 byte DID data field overwrites the 2 byte op code portion of the VLAN. In contrast, in the example of FIG. 14, the storage of the control information in the packet may result in a net increase in the packet size.

To see this, observe that in a first mode of operation, in which the format of FIG. 14 is utilized, the communication of the control information over the backplane does not necessarily occur in band. Consider the case in which the 4 byte VLAN represented by fields 1412 and 1414 is inserted into the packet by the switch because it was not present when the packet was received over the network. The addition of the DID in this example results in a net 4 byte increase in the size of the packet. Thus, additional clock cycles will be required in this example to communicate the control information over the backplane.

In a second mode of operation, however, in which the format of FIG. 15 is utilized, the communication of the control information over the backplane always occurs in band. To observe this, consider the case in which the VLAN represented by field 1510 is inserted into the packet by the switch. The addition of the DID in this example results in no net increase in packet size since the data portion of the DID overwrites the op code portion of the VLAN, the op code portion of the DID is eliminated, and the VLAN op code is represented by the 1 bit Ethertype Select field encoded into the control information. Thus, additional clock cycles will not be required to communicate the control information over the backplane.

Figure 16:
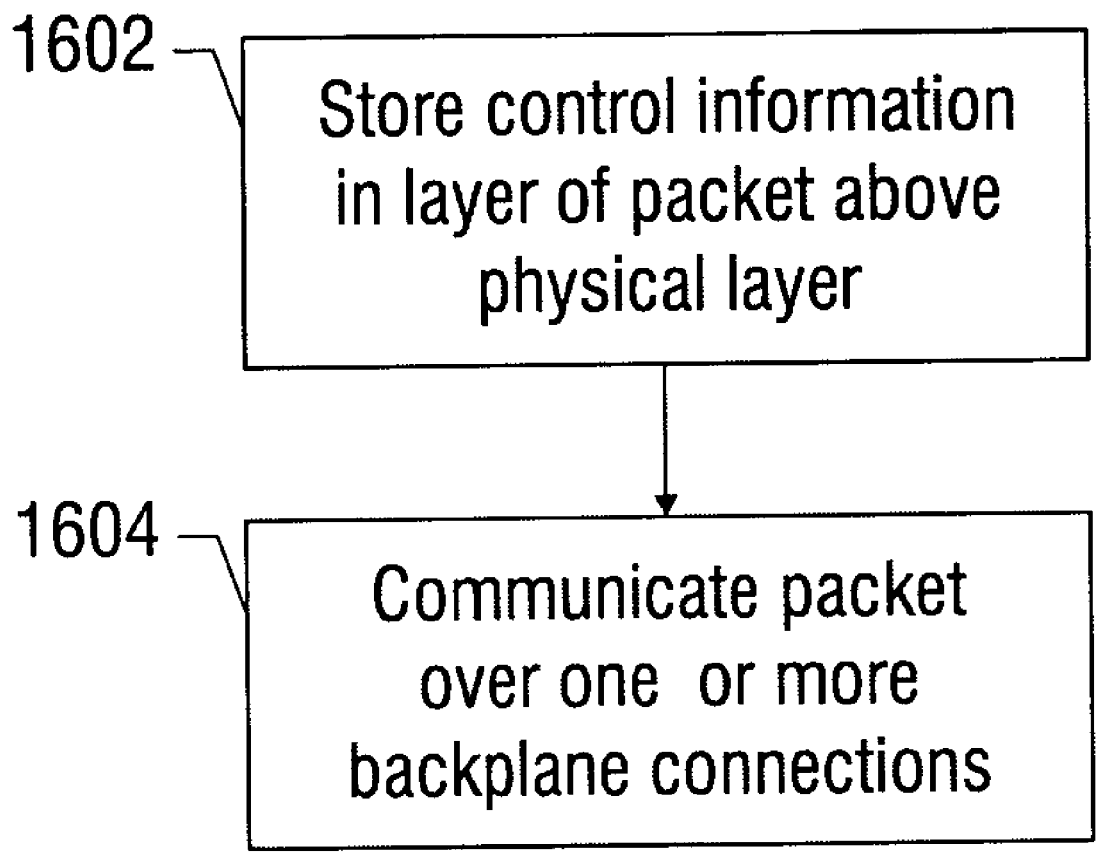
FIG. 16 is a flowchart of one embodiment of a method of communicating control information between two or more entities over one or more backplane connections.

FIG. 16 is a flowchart illustrating one embodiment of a method of communicating control information over one or more backplane connections between two or more entities. The method comprises steps 1602 and 1604. In step 1602, the method comprises storing the control information in a layer of a packet above the physical layer. In step 1604, the method comprises communicating the packet over one or more of the backplane connections.

In this method, the control information may be stored in at least a portion of one or more fields inserted into the packet to accommodate the control information. Alternatively, the control information may overwrite at least a portion of one or more pre-existing fields in the packet with the control information.

Also, the two or more entities may comprise a switch, and the control information may be proprietary to the switch. Also, the switch may have ingress and egress ports. The proprietary control information may comprise an identifier of an ingress port of the switch at which the packet was received over a network. The proprietary control information may also comprise an identifier of an egress port of the switch at which the packet will or is expected to be transmitted over a network.

The proprietary control information may also comprise an indicator of whether or not one or more predetermined fields were present in the packet upon receipt thereof at the switch. These one or more predetermined fields may comprise a VLAN. The proprietary control information may also comprise an indicator of a state of the ingress port of the switch at which the packet was received.

The control information may be stored in layer two or higher of the packet according to the OSI reference model. The control information may also be stored in layer two of the packet according to the OSI reference model. In one example, the control information is stored in the MAC sub-layer of the packet.

The control information may overwrite at least a portion of one or more fields stored in the MAC sub-layer of the packet. These one or more fields may comprise a VLAN. Alternatively, these one or more fields may comprise MAC sub-layer source or destinations addresses.

The VLAN may comprise op code and tag portions, and the control information may overwrite the op code portion of the VLAN after the control information has been encoded to include an identifier of the VLAN op code overwritten by the control information. The VLAN may comprise the outer VLAN of a plurality of nested VLANs.

The control information may comprise quality of service information for the packet. This quality of service information may comprise an identifier of a queue for buffering the packet. The control information may also comprise an indicator that the packet is a candidate for dropping.

In one embodiment, the control information is communicated in-band over the one or more backplane connections. In a second embodiment, the control information is derived from a packet header, and the packet header is deleted prior to communication of the packet over the one or more backplane connections. At least a portion of the packet header may be re-created from the control information after communication of the packet over the one or more backplane connections.

Figure 17:
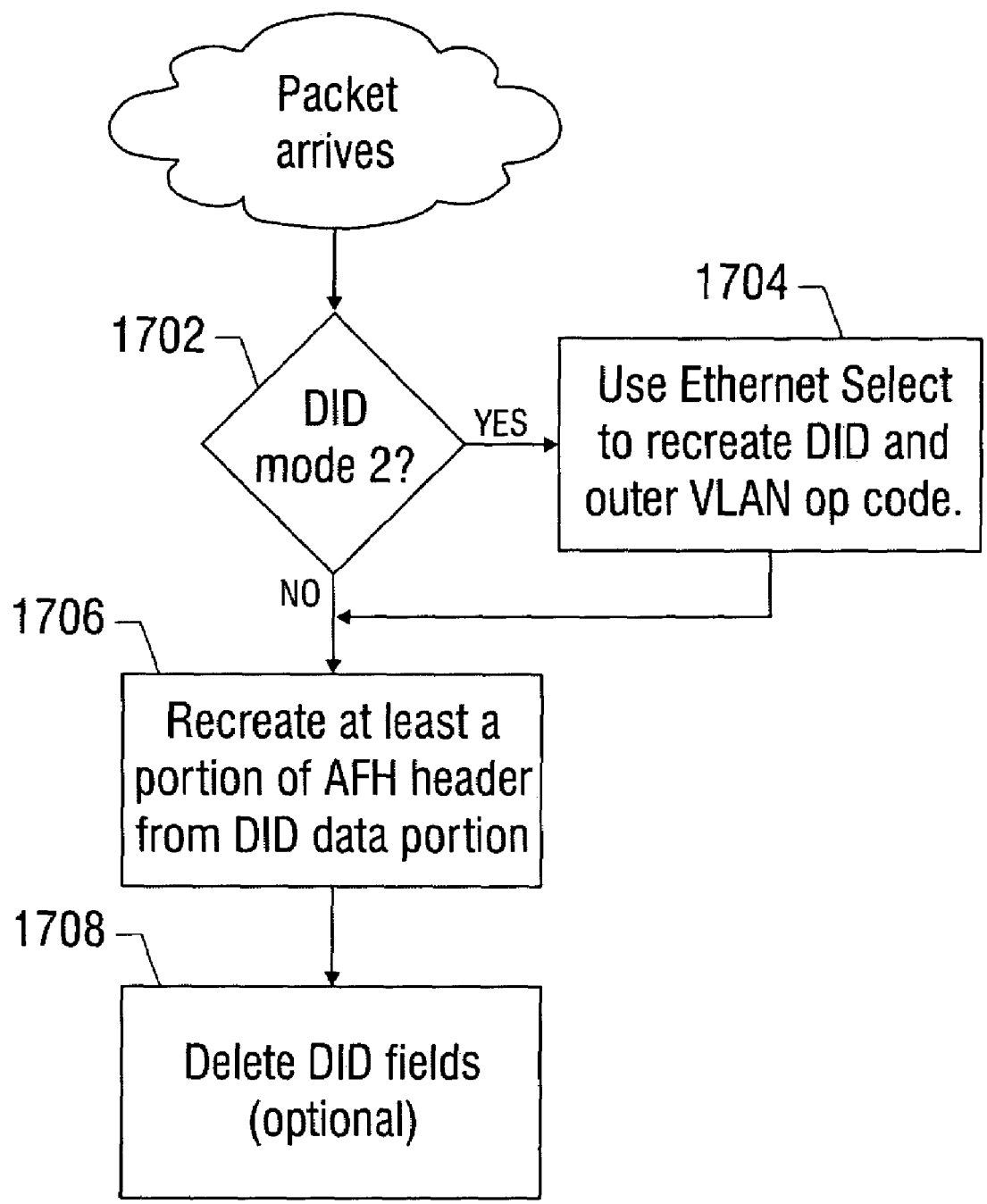
FIG. 17 is a flowchart of one embodiment of a method of re-creating at least a portion of a packet header after passage of the packet over a backplane connection.

FIG. 17 is a flowchart of a method of re-creating at least a portion of a packet header from control information control information encoded into the body of the packet in accordance with either of the two formats illustrated in FIGS. 14 and 15. The method begins when a packet arrives over a backplane connection. Inquiry step 1702 is then performed. In inquiry step 1702, it is determined which mode of operation is in effect, e.g., mode 1 (FIG. 14 format) or mode 2 (FIG. 15 format). If mode 2 is in effect, step 1704 is performed. If mode 1 is in effect, a branch to step 1706 is performed. In step 1704, the Ethertype Select bit encoded into the control information (the data portion of the DID, field 1508 in FIG. 15) is used to re-create the VLAN op code portion within the packet. The format of the packet is thus transformed into that illustrated in FIG. 14. A branch is then performed to step 1706.

In step 1706, the data portion of the DID is used to recreate at least a portion of the AFH header. In one implementation, one or more of the DID data fields are copied into the AFH header. Optional step 1708 is then performed. In optional step 1708, the DID is deleted from the packet.

Figure 18:
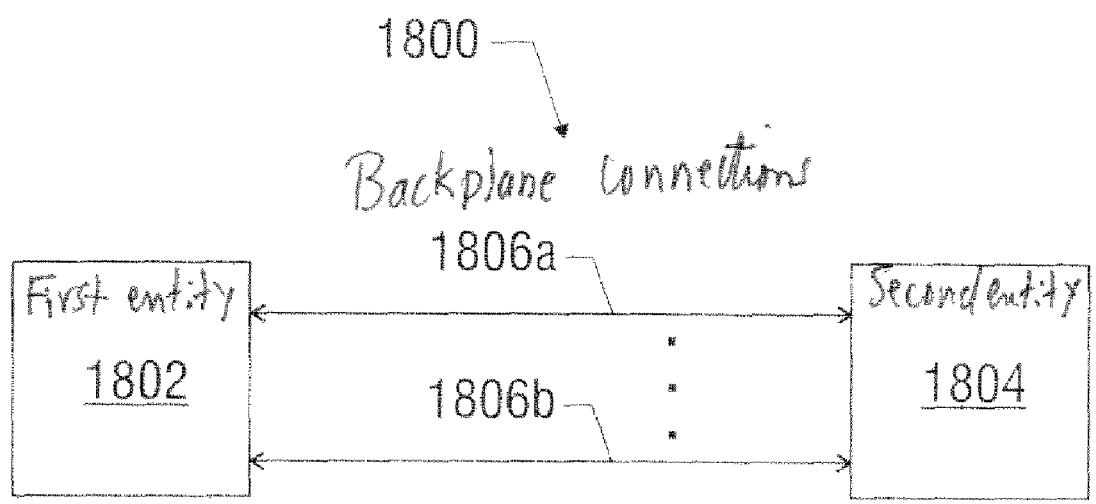
FIG. 18 is a block diagram of one embodiment of a system for performing load balancing over a plurality of backplane connections.

FIG. 18 is a block diagram of one embodiment of a system 1800 for performing load balancing over a plurality of backplane connections 1806a, 1806b between two or more entities 1802, 1804. In this embodiment, first logic maps control information for a packet into one or more identifiers of one or more of the plurality of backplane connections, and second logic communicates the packet over the identified one or more backplane connections.

The two or more entities may comprise a switch, and the control information may comprise an identifier of an ingress port at which the packet was received over a network. Alternatively, the control information may comprise an identifier of an egress port at which the packet will or is expected to be transmitted over a network. The two or more entities may each comprise ASICs.

In one implementation, the first logic comprises a LUT for maintaining an association between ingress or egress ports and the backplane connections, and the first logic maps a particular ingress or egress port into one or more backplanes connection through an access to the LUT. In one implementation example, the association is programmed into the LUT.

This association may be predetermined to achieve a desired load balancing of packets over the plurality of backplane connections.

Figure 19:
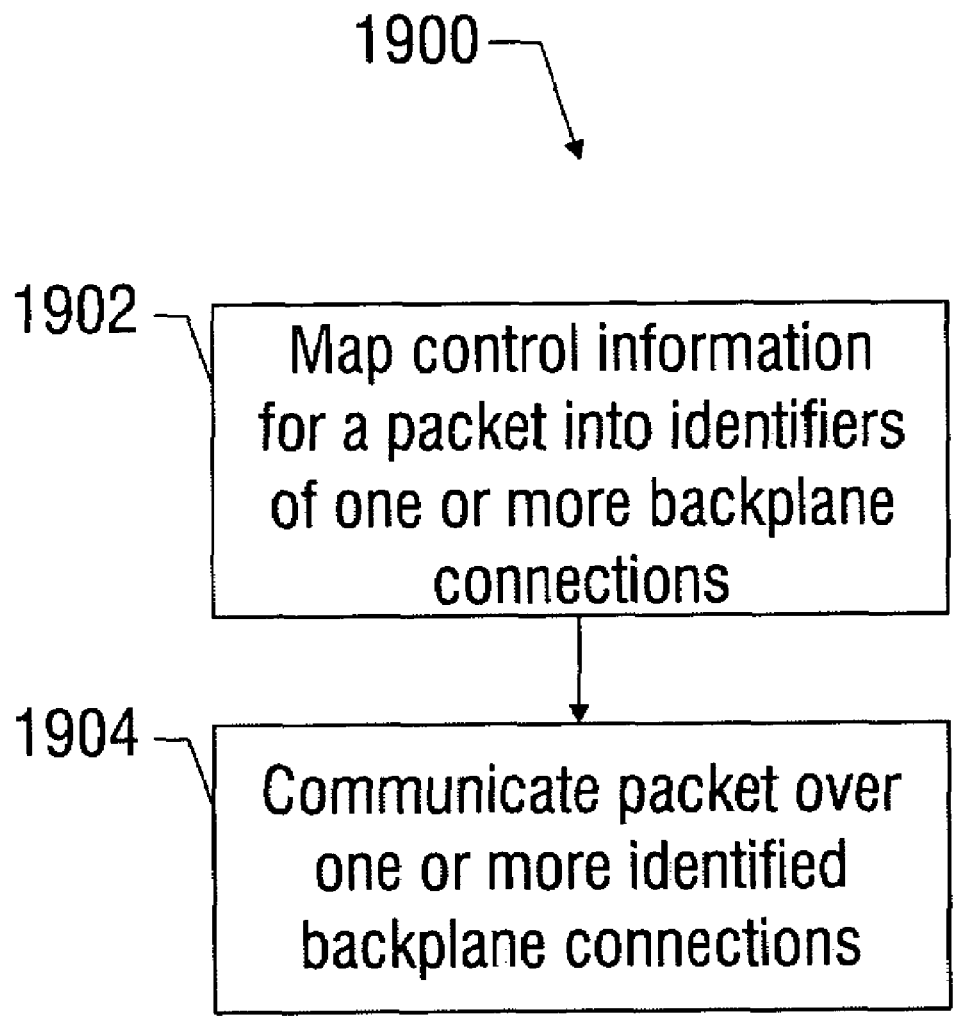
FIG. 19 is a flowchart of one embodiment of a method of performing load balancing over a plurality of backplane connections.

FIG. 19 illustrates a flowchart of one embodiment of a method of performing load balancing over a plurality of backplane connections between two or more entities. In this embodiment, the method comprises steps 1902 and 1904. In step 1902, the method comprises mapping control information for a packet into one or more identifiers of one or more of the plurality of backplane connections. In step 1904, the method comprises communicating the packet over the one or more identified backplane connections.

The two or more entities may comprise a switch, and the control information may comprise an identifier of ingress port at which the packet was received over a network. Alternatively, the control information may comprise an identifier of an egress port at which the packet will or is expected to be transmitted over a network. The two or more entities may each comprise ASICs.

In one implementation, a LUT maintains an association between ingress or egress ports and the backplane connections. In this implementation, an identifier of an ingress or egress port is mapped into one or more backplane connections through an access to the LUT. This association may be programmed into the LUT. Also, this association may be predetermined to achieve a desired load balancing of packets over the plurality of backplane connections.

Figure 20:
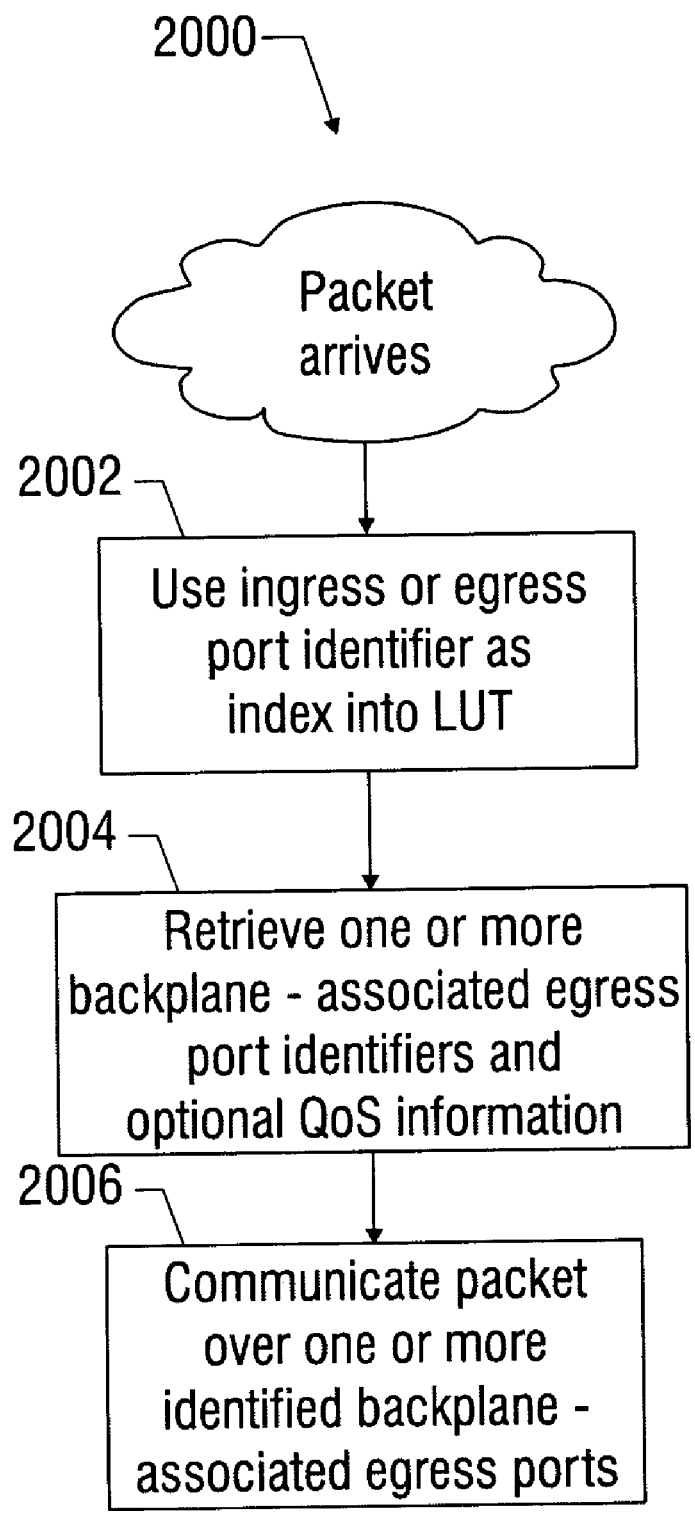
FIG. 20 is a flowchart of one implementation of the method of FIG. 19.

A flowchart of one example 2000 of this implementation is illustrated in FIG. 20. In this example, the LUT maintains an association between ingress or egress ports, and the plurality of backplane connections. After or upon a packet arriving at one of the entities, step 2002 is performed. In step 2002, an access is made to the LUT using as an index an identifier of the ingress or egress port. Step 2004 is performed. In step 2004, one or more backplane connections (each of which is represented by an egress port identifier) associated with the ingress or egress ports is retrieved from the LUT. In addition, related QoS information may also be retrieved. This QoS information may be used to identify a queue into which the packet is stored before transmission over the one or more backplane connections. Step 2006 is then performed. In step 2006, the packet is communicated over the one or more egress ports associated with the one or more backplane connections.

Figure 21:
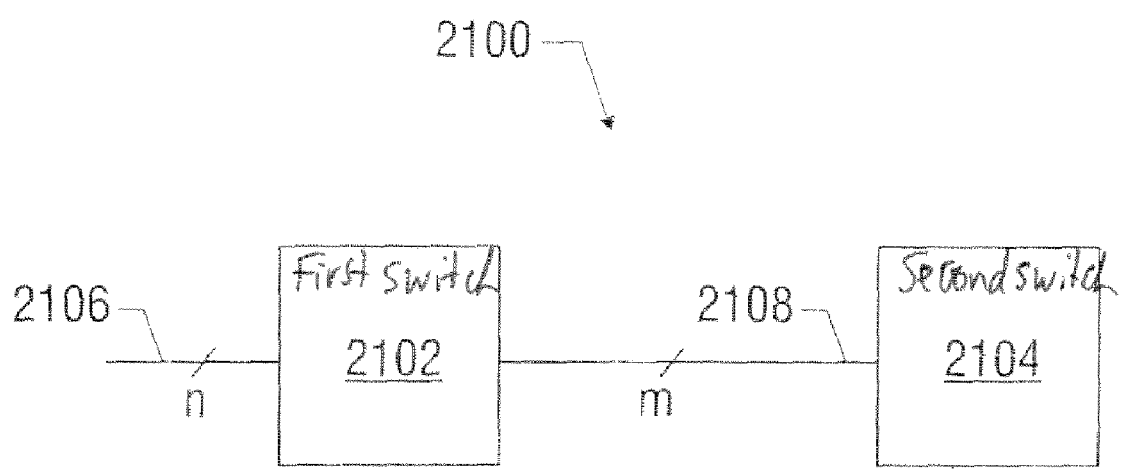
FIG. 21 is a block diagram of one embodiment of a system for extending the number of ports of a switch.

FIG. 21 is a block diagram of one embodiment 2100 of a system for extending the number of ports of a switch. In this embodiment, the system comprises a first switch 2102 coupled to a second switch 2104. The first switch 2102 has a plurality of n ports 2106, where n is an integer of two or more, and the second switch 2104 has a plurality of m ports 2108, wherein m is an integer of two or more. The number n of ports of the first switch 2106 exceeds the number m of ports of the second switch 2104. The first switch 2102 is coupled to the second switch. In one implementation, illustrated in FIG. 21, the coupling is achieved through one or more of the m ports 2108 of the second switch 2104.

In this embodiment, first logic stores in a layer of a packet above the physical layer an identifier of a port of the first switch. Second logic then communicates the packet between the first and second switches.

In one embodiment, the port is an ingress port of the first switch at which the packet was received over a network. In this embodiment, the second logic communicates the packet from the first switch to the second switch. From the standpoint of the network, the second switch thus appears to have n ports rather than m ports.

In a second embodiment, the port is a destination port of the first switch at which the packet will or is expected to be transmitted over a network. In this embodiment, the second logic communicates the packet from the second switch to the first switch. The packet may then be transmitted over the network from the designated port. Again, from the standpoint of the network, the second switch 2104 appears to have n rather than m ports.

The port identifier may be stored in layer two or higher of the packet according to the OSI reference model. The port identifier may also be stored in layer two of the packet according to the OSI reference model. In one example, the port identifier is stored in the MAC sub-layer of the packet.

The port identifier may be stored in the packet in the form of one or more standard fields. In one example, the port identifier is stored in the packet as a VLAN.

Figure 22:
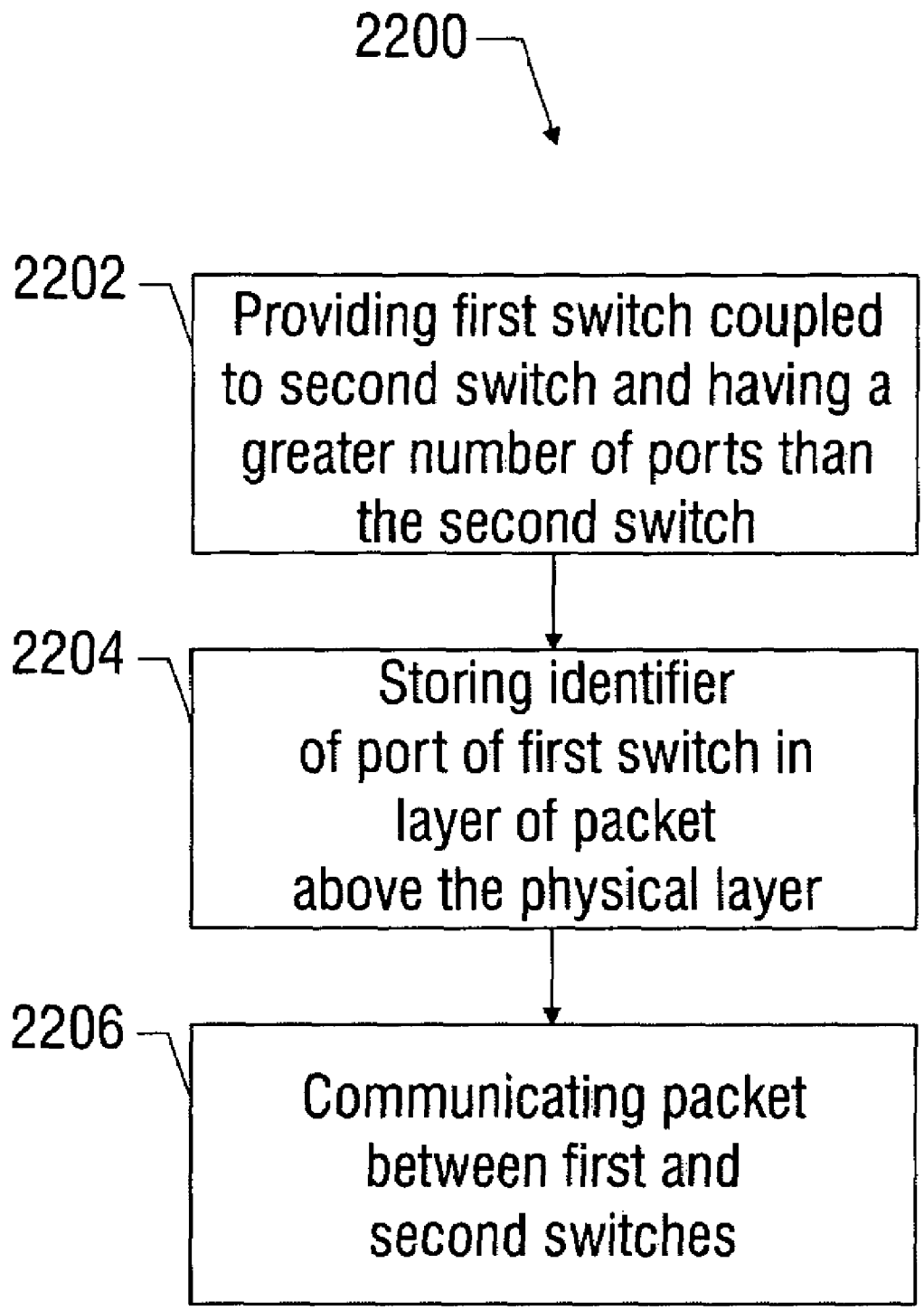
FIG. 22 is a flowchart of one embodiment of a method of extending the number of ports of a switch.

FIG. 22 is flowchart of one embodiment 2200 of a method of extending the number of ports of a switch. In this embodiment, the method comprises steps 2202, 2204, and 2206. In step 2202, the method comprises providing a first switch coupled to a second switch and having a greater number of ports than the second switch. In step 2204, the method comprises storing in a layer of the packet above the physical layer an identifier of a port of the first switch. In step 2206, the method comprises communicating the packet between the first and second switches.

In one embodiment, the port is an ingress port of the first switch at which the packet was received over a network. In this embodiment, the packet is communicated from the first switch to the second switch. From the standpoint of the network, the second switch appears to be configured with a greater number of ingress ports of the first switch.

In a second embodiment, the port is an egress port of the first switch at which the packet will or is expected to be transmitted over a network. In this embodiment, the packet is communicated from the second switch to the first switch. The packet may then be transmitted over the network from the egress port of the first switch. From the standpoint of the network, the second switch appears to be configured with the greater number of egress ports of the first switch.

The port identifier may be stored in layer two or higher of the packet according to the OSI reference model. The port identifier may also be stored in layer two of the packet according to the OSI reference model. In one example, the port identifier is stored in the MAC sub-layer of the packet.

The port identifier may be stored in the packet in the form of one or more standard fields. In one example, the port identifier is stored in the packet in the form of a VLAN.

Figure 23:
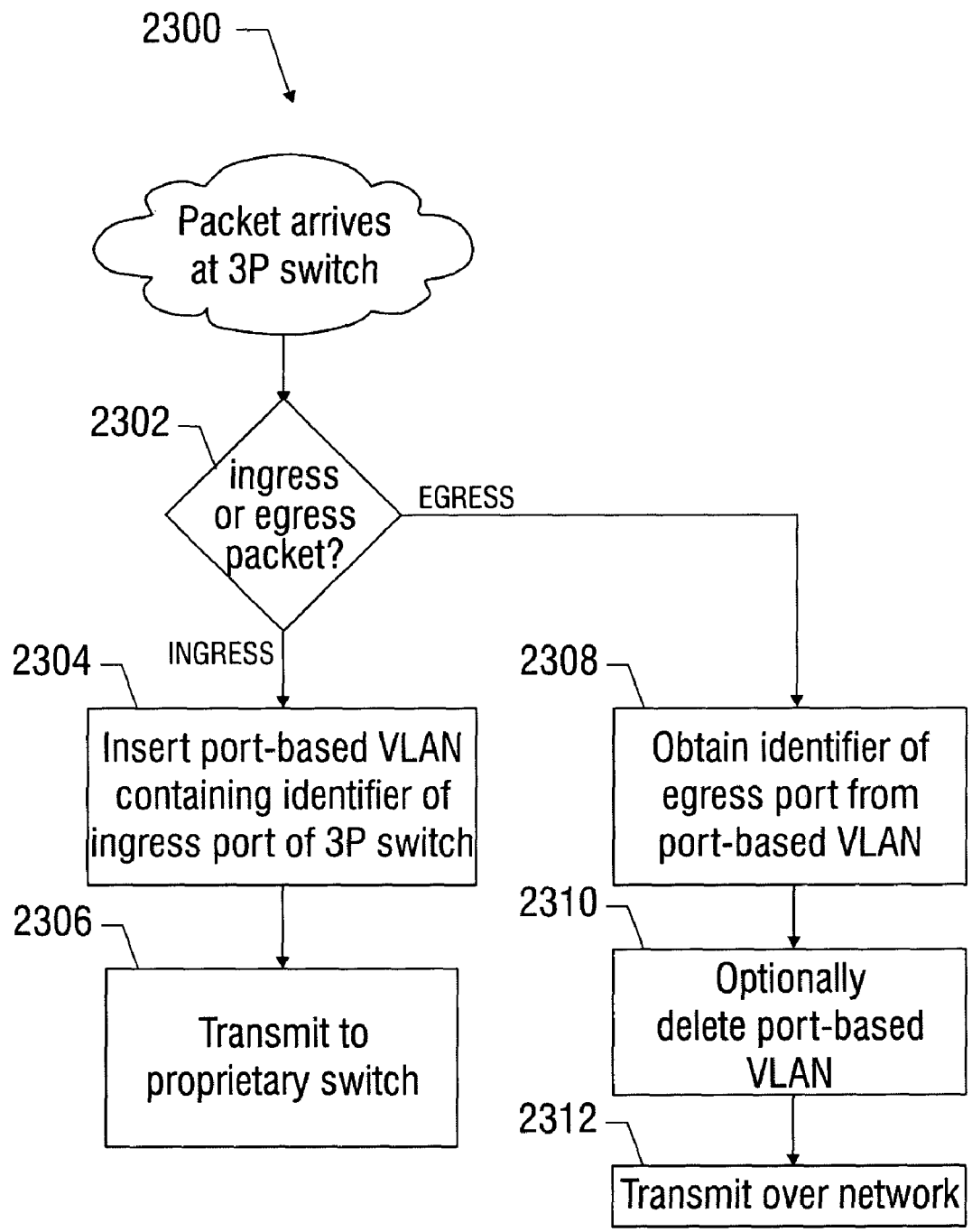
FIGS. 23 and 24 are flowcharts of embodiments of a method of employing a VLAN inserted into a packet to convey an ingress or egress port identifier from one switch to another.
Figure 24:
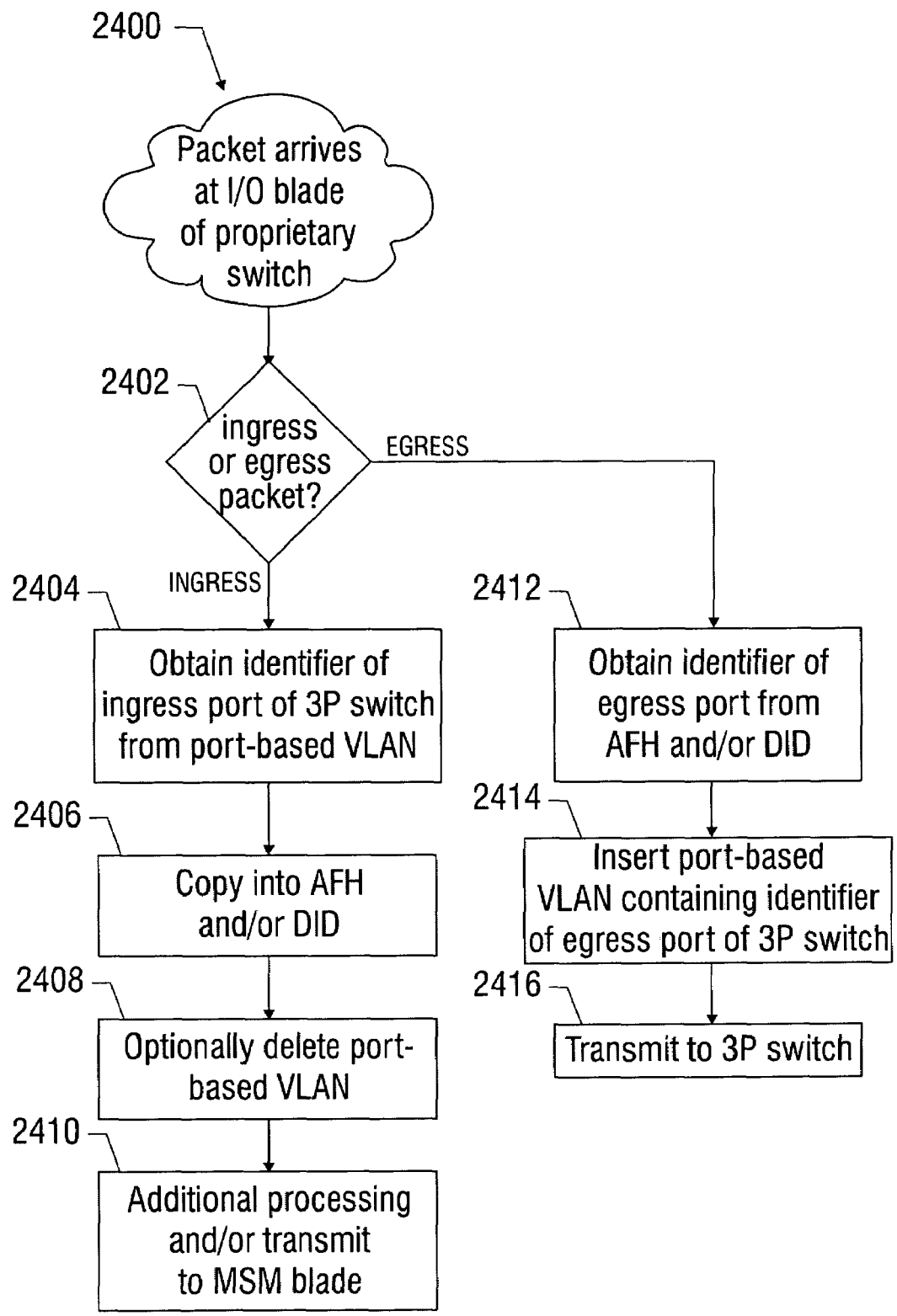

FIGS. 23 and 24 are flowcharts illustrating one implementation of a method of extending the number of ports of a proprietary switch. The proprietary switch is coupled to a third party switch having a greater number of ports than the proprietary switch. FIG. 23 illustrates the processing steps 2300 which occur at the third party switch in this implementation. FIG. 24 illustrates the processing steps 2400 which occur at the proprietary switch in this implementation.

Referring to FIG. 23, upon or after a packet arrives at the third party switch, inquiry step 2302 is performed. In inquiry step 2302, it is determined whether the packet is an ingress packet which has been received over a network, or an egress packet which will or is expected to be transmitted over a network. If an ingress packet, the method branches to step 2304. If an egress packet, the method branches to step 2308.

In step 2304, the method inserts a VLAN into the MAC sub-layer of the packet, and stores in the VLAN an identifier of the ingress port at which the packet was received at the third party switch. Step 2306 is then performed. In step 2306, the packet is transferred to the proprietary switch.

In step 2308, it is assumed that a VLAN has already been inserted into the MAC sub-layer of the packet containing an identifier of the egress port of the third party switch at which the packet will or is expected to be transmitted over a network. The identifier of this egress port is retrieved from the VLAN.

Optional step 2310 is then performed. In optional step 2310, the VLAN carrying the egress port identifier is deleted. Step 2312 is then performed. In step 2312, the packet is transmitted over the network from the designated egress port of the third party switch.

Referring to FIG. 24, upon of after a packet arrives at the proprietary switch, inquiry step 2402 is performed. In inquiry step 2402, it is determined whether the packet is an ingress packet which has been received over a network, or an egress packet which will or is expected to be transmitted over a network. If the packet is an ingress packet, the method branches to step 2404. If the packet is an egress packet, the method branches to step 2412.

In step 2404, it is assumed that a VLAN has previously been inserted into the MAC sub-layer of the packet containing an identifier of the ingress port of the third party switch at which the packet was received over a network. In this step, an identifier of this ingress port is obtained from the VLAN.

Step 2406 is then performed. In step 2406, the identifier is copied into an AFH header pre-pended to the packet and/or a DID inserted into the MAC sub-layer of the packet.

Optional step 2408 may then be performed. If performed, the port-based VLAN previously inserted into the packet is deleted.

Step 2410 is then performed. In step 2410, additional processing of the packet is performed and/or the packet is transferred to an MSM blade in the proprietary switch over one or more backplane connections using any of the embodiments, implementations, or examples of the methods which have been previously described.

In step 2412, it is assumed that an identifier of the egress port at which the packet will or is expected to be transmitted over a network has been previously stored in an AFH header pre-pended to the packet and/or a DID inserted into the MAC sub-layer of the packet. In this step, this identifier is determined by accessing the AFH and/or DID.

Step 2414 is then performed. In step 2414, a VLAN is inserted into the MAC sub-layer of the packet, and an identifier of the egress port of the third party switch is stored in the VLAN.

Step 2416 is then performed. In step 2416, the packet is transmitted to the third party switch.

The methods of FIGS. 6, 16, 17, 19, 20, 22, 23, and 24, and any of the embodiments, implementations, variants and examples which have been discussed or suggested, may be implemented through software, hardware, or any combination of hardware and software. In relation to the software implementation, the methods may be embodied in the form of software instructions stored in a memory. Furthermore, this memory may be accessible by a processor in a system, wherein the processor is configured to successively retrieve and execute the software instructions.

While various embodiments of the invention have been described, it will be apparent to those of ordinary skill in the art that many more embodiments and implementations are possible that are within the scope of this invention.

What is claimed is:

1. A system, associated with a network entity, for communicating proprietary control information over one or more backplane connections interconnecting one or more I/O blades with one or more management/switching (MSM) blades without functioning as a user interface, with the one or more backplane connections coupled to the one or more I/O blades through one or more backplane-side MAC controllers, and coupled to the one or more MSM blades through one or more backplane-side MAC controllers, comprising:
   first logic for storing proprietary control information, comprising control information recognized by the network entity but not generally recognized by other network entities, within a layer of a packet above the physical layer; and
   second logic for communicating the packet, including the proprietary control information, over the one or more of the backplane connections;
   wherein the proprietary control information as stored in the packet either replaces or appears in the packet to any third party devices that may happen to gain access as at least a portion of one or more standard packet fields;
   wherein the first logic derives at least a portion of the control information from a packet header, and deletes the packet header prior to communication of the packet over the one or more backplane connections, and wherein a third logic re-creates at least a portion of the packet header from the control information after communication of the packet over the one or more backplane connections.

2. The system of claim 1 wherein the control information is stored in at least a portion of one or more fields inserted into the packet by the first logic.

3. The system of claim 1 wherein the first logic overwrites at least a portion of one or more pre-existing fields in the packet with the control information.

4. The system of claim 1 wherein the network entity comprises a switch, and the control information is proprietary to the switch.

5. The system of claim 4 wherein the switch has ingress and egress ports.

6. The system of claim 5 wherein the proprietary control information comprises an identifier of an ingress port of the switch at which the packet was received over a network.

7. The system of claim 5 wherein the proprietary control information comprises an identifier of an egress port of the switch at which the packet will or is expected to be transmitted over a network.

8. The system of claim 5 wherein the proprietary control information comprises an indicator of whether or not one or more predetermined fields were present in the packet upon receipt thereof at the switch.

9. The system of claim 8 wherein the one or more predetermined fields comprise a VLAN.

10. The system of claim 1 wherein the control information is stored in layer two or higher of the packet according to the OSI reference model.

11. The system of claim 10 wherein the control information is stored in layer two of the packet according to the OSI reference model.

12. The system of claim 11 wherein the control information is stored in the MAC sub-layer of the packet.

13. The system of claim 12 wherein the control information overwrites at least a portion of a VLAN stored in the MAC sub-layer of the packet.

14. The system of claim 12 wherein the control information overwrites at least a portion of source or destination addresses stored in the MAC sub-layer of the packet.

15. The system of claim 9 wherein the VLAN comprises op code and tag portions, and the first logic overwrites the op code portion of the VLAN with the control information.

16. The system of claim 15 wherein the control information comprises an identifier of the VLAN op code overwritten by the control information.

17. The system of claim 9 wherein the VLAN is the outer VLAN of a plurality of nested VLANs.

18. The system of claim 1 wherein the control information comprises quality of service information for the packet.

19. The system of claim 18 wherein the quality of service information comprises an identifier of a queue for buffering the packet and priority for the queue is selected based upon the quality of service information of the packet.

20. The system of claim 1 wherein the control information comprises an indicator that the packet is a candidate for dropping.

21. The system of claim 1 wherein by dropping a portion of the packet, the control information is added to the packet and the packet is communicated in-band over the one or more backplane connections without requiring additional clock cycles.

22. A method, performed in, by or for a network entity, of communicating proprietary control information over one or more backplane connections interconnecting one or more I/O blades with one or more management/switching (MSM) blades without functioning as a user interface, with the one or more backplane connections coupled to the one or more I/O blades through one or more backplane-side MAC controllers, and coupled to the one or more MSM blades through one or more backplane-side MAC controllers, comprising:
   storing proprietary control information, comprising control information recognized by the network entity but not generally recognized by other network entities, in a layer of a packet above the physical layer; and
   communicating the packet, including the proprietary control information, over the one or more of the backplane connections,
   wherein the proprietary control information as stored in the packet either replaces or appears in the packet to one or more any third party devices that may happen to gain access as at least a portion of one or more standard packet fields;
   wherein at least a portion of the control information is derived from a packet header, and is deleted from the packet header prior to communication of the packet over the one or more backplane connections, and wherein at least a portion of the packet header from the control information is re-created after communication of the packet over the one or more backplane connections.

23. The method of claim 22 further comprising storing the control information in at least a portion of one or more fields inserted into the packet to accommodate the control information.

24. The method of claim 22 further comprising overwriting at least a portion of one or more pre-existing fields in the packet with the control information.

25. The method of claim 22 wherein the network entity comprises a switch, and the control information is proprietary to the switch.

26. The method of claim 25 wherein the switch has ingress and egress ports.

27. The method of claim 26 wherein the proprietary control information comprises an identifier of an ingress port of the switch at which the packet was received over a network.

28. The method of claim 26 wherein the proprietary control information comprises an identifier of an egress port of the switch at which the packet will or is expected to be transmitted over a network.

29. The method of claim 26 wherein the proprietary control information comprises an indicator of whether or not one or more predetermined fields were present in the packet upon receipt thereof at the switch.

30. The method of claim 29 wherein the one or more predetermined fields comprise a VLAN.

31. The method of claim 27 wherein the proprietary control information comprises an indicator of a state of the ingress port of the switch at which the packet was received.

32. The method of claim 22 wherein the control information is stored in layer two or higher of the packet according to the OSI reference model.

33. The method of claim 32 wherein the control information is stored in layer two of the packet according to the OSI reference model.

34. The method of claim 33 wherein the control information is stored in the MAC sub-layer of the packet.

35. The method of claim 34 wherein the control information overwrites at least a portion of one or more fields stored in the MAC sub-layer of the packet.

36. The method of claim 35 wherein the one or more fields comprise a VLAN.

37. The method of claim 35 wherein the one or more fields comprise source or destinations addresses.

38. The method of claim 36 wherein the VLAN comprises op code and tag portions, and the control information overwrites the op code portion of the VLAN.

39. The method of claim 38 wherein the control information comprises an identifier of the VLAN op code overwritten by the control information.

40. The method of claim 36 wherein the VLAN comprises the outer VLAN of a plurality of nested VLANs.

41. The method of claim 22 wherein the control information comprises quality of service information for the packet.

42. The method of claim 41 wherein the quality of service information comprises an identifier of a queue for buffering the packet and priority for the queue is selected based upon the quality of service information of the packet.

43. The method of claim 22 wherein the control information comprises an indicator that the packet is a candidate for dropping.

44. The method of claim 22 wherein by dropping a portion of the packet, the control information is added to the packet and the packet is communicated in-band over the one or more backplane connections without requiring additional clock cycles.

45. The system of claim 5 wherein the switch is a first switch, and the proprietary control information comprises an identifier of an ingress port of a second switch coupled to the first switch at which the packet was received over a network.

46. The method of claim 26 wherein the switch is a first switch, and the proprietary control information comprises an identifier of an ingress port of a second switch coupled to the first switch at which the packet was received over a network.

47. The system of claim 1 wherein the third logic for maintaining a mode bit having first and second states, wherein the first logic is configured to add one or more fields to the packet layer to accommodate the control information if the mode bit is in the first state, and overwrite at least a portion of one or more pre-existing fields in the packet layer with the control information if the mode bit is in the second state.

48. The method of claim 22 further comprising:
   maintaining a mode bit having first and second states;
   adding one or more fields to the packet layer to accommodate the control information if the mode bit is in the first state; and overwriting at least a portion of one or more pre-existing fields in the packet layer with the control information if the mode bit is in the second state.

49. A system, associated with a network entity, for performing load balancing over a plurality of backplane connections interconnecting one or more I/O blades with one or more management/switching (MSM) blades without functioning as a user interface, with the one or more backplane connections coupled to the one or more I/O blades through one or more backplane-side MAC controllers, and coupled to the one or more MSM blades through one or more backplane-side MAC controllers, the system comprising:

first logic for receiving a packet at any one of the one or more I/O blades or one or more MSM blades, mapping control information for the packet into one or more identifiers of at least one of the plurality of backplane connections, wherein the mapping occurs through a data structure configured to achieve a desired load balancing of packets over the plurality of backplane connections; and second logic for communicating the packet over the at least one of the plurality of backplane connections identified by the one or more identifiers;

wherein quality of service information is used to identify a queue into which the packet is stored before transmission over the at least one of the plurality of backplane connections and priority for the queue is selected based upon the quality of service information of the packet.

50. The system of claim 49 wherein the network entity comprises a switch, and the control information is an identifier of an ingress port at which the packet was received over a network, or an egress port at which the packet will or is expected to be transmitted over a network.

51. The system of claim 50 wherein the first logic comprises a lookup table ("LUT") for maintaining an association between ingress or egress ports, and egress ports associated with the backplane connections, and the first logic maps a particular ingress or egress ports into one or more backplane-associated egress ports through an access to the LUT.

52. The system of claim 51 wherein the association is programmed into the LUT.

53. The system of claim 52 wherein the association is pre-determined to achieve a desired load balancing of packets over the plurality of backplane connections.

54. The system of claim 49 wherein the two or more entities are each ASICs.

55. A method, performed in, by or for a network entity, of performing load balancing over a plurality of backplane connections, interconnecting one or more I/O blades with one or more management/switching (MSM) blades without functioning as a user interface, with the plurality of backplane connections coupled to the one or more I/O blades through one or more backplane-side MAC controllers, and coupled to the one or more MSM blades through one or more backplane-side MAC controllers, the method comprising:

receiving the packet at any one of the one or more I/O blades or one or more MSM blades;

mapping control information for a packet into one or more identifiers of at least one of the plurality of backplane connections through a data structure configured to achieve a desired load balancing of packets over the plurality of backplane connections; and communicating the packet over the at least one of the plurality of backplane connections identified by the one or more identifiers;

wherein quality of service information is used to identify a queue into which the packet is stored before transmission over the at least one of the plurality of backplane connections and priority for the queue is selected based upon the quality of service information of the packet.

56. The method of claim 55 wherein the network entity comprises a switch, and the control information comprises an identifier of an ingress port at which the packet was received over a network, or an egress port at which the packet will or is expected to be transmitted over a network.

57. The method of claim 56 further comprising using a lookup table ("LUT") to maintain an association between ingress or egress ports and egress ports associated the backplane connections, and mapping an ingress or egress port into one or more of the backplane-associated egress ports through an access to the LUT.

58. The method of claim 57 further comprising programming the association into the LUT.

59. The method of claim 58 wherein the association is pre-determined to achieve a desired load balancing of packets over the plurality of backplane connections.

60. The method of claim 55 wherein the network entity comprises one or more application specific integrated circuits (ASICs).

61. A system for extending the number of ports of a switch in a network comprising:

a first switch coupled to a second switch and the first switch having a greater number n of network-side ports than the number m of network-side ports of the second switch;

first logic associated with the first switch for determining if a packet received at a port of the first switch is an ingress packet or an egress packet, and, if the packet is an ingress packet, storing in a layer of the packet above the physical layer an identifier of the port of the first switch at which the packet was received, and communicating the packet from the first switch to the second switch, and, if the packet is an egress packet, retrieving from a layer of the packet above the physical layer an identifier of a port of the first switch at which the packet is to be transmitted, and transmitting the packet over the network from the identified port of the first switch; and second logic associated with the second switch for determining if a packet received at a port of the second switch is an ingress packet or an egress packet, and, if the packet is an egress packet, storing in a layer of the packet above the physical layer an identifier of a port of the first switch from which the packet is to be transmitted over the network, and communicating the packet from the second switch to the first switch, and, if the packet is an ingress packet, retrieving from a layer of the packet above the physical layer an identifier of a port of the first switch at which the packet was received over the network, copying or inserting the identifier into a packet header for or data element of the packet, and performing additional processing of the packet, wherein the second switch appears to the network to have n network-side ports rather than m network-side ports.

62. The system of claim 61 wherein the first switch has ingress and egress ports, and, when an ingress packet is received at an ingress port of the first switch, the first logic stores an identifier of the ingress port in a layer of the packet above the physical layer, and thereafter communicates the packet from the first switch to the second switch.

63. The system of claim 61 wherein the first switch has ingress and egress ports, and, when an egress packet is received at the second switch, the second logic stores an identifier of an egress port of the first switch at which the packet will or is expected to be transmitted over a network, and thereafter communicates the packet from the second switch to the first switch.

64. The system of claim 61 wherein the first logic, when an ingress packet is received at a port of the first switch, stores an identifier of the port in layer two or higher of the packet according to the OSI reference model.

65. The system of claim 64 wherein the identifier is stored in layer two of the packet according to the OSI reference model.

66. The system of claim 65 wherein the identifier is stored in the MAC sub-layer of the packet.

67. The system of claim 66 wherein the identifier is stored in the packet in the form of one or more standard fields.

68. The system of claim 66 wherein the identifier is stored in the packet as a VLAN.

69. A method of extending the number of ports of a switch in a network comprising:
   providing a first switch coupled to a second switch and the first switch having a greater number n of network-side ports than the number m of network-side ports of the second switch;
   in, by or for the first switch, when a packet is received at the first switch, determining if the packet is an ingress packet or an egress packet, and, if an ingress packet, storing in a layer of the packet above the physical layer an identifier of a port of the first switch at which the packet was received, and communicating the packet from the first switch to the second switch, and, if the packet is an egress packet, retrieving from a layer of the packet above the physical layer an identifier of a port of the first switch from which the packet is to be transmitted over the network, and transmitting the packet over the network from that port; and
   in, by or for the second switch, when a packet is received at the second switch, determining if the packet is an ingress packet or an egress packet, and, if an egress packet, storing in a layer of the packet above the physical layer an identifier of a port of the first switch from which the packet is to be transmitted over the network, and communicating the packet from the second switch to the first switch, and, if the packet is an ingress packet, retrieving from a layer of the packet above the physical layer an identifier of a port of the first switch at which the packet was received from the network, copying or inserting the identifier into a header for or data element of the packet, and performing additional processing of the packet,
   wherein the second switch appears to the network to have n network-side ports rather than m network-side ports.

70. The method of claim 69 wherein the first switch has ingress and egress ports, and, when an ingress packet is received at an ingress port of the first switch, an identifier of the ingress port is stored in a layer of the packet above the physical layer, and the packet is thereafter communicated from the first switch to the second switch.

71. The method of claim 69 wherein the first switch has ingress and egress ports, and, when an egress packet is received at the second switch, an identifier of an egress port of the first switch from which the packet is to be transmitted over the network is inserted in a layer of the packet over the physical layer, and the packet thereafter communicated from the second switch to the first switch.

72. The method of claim 69 wherein, when an ingress packet is received at the first switch, an identifier of the port of the first switch at which the packet was received is stored in layer two or higher of the packet according to the OSI reference model.

73. The method of claim 72 wherein the identifier is stored in layer two of the packet according to the OSI reference model.

74. The method of claim 73 wherein the identifier is stored in the MAC sub-layer of the packet.

75. The method of claim 74 wherein the identifier is stored in the packet in the form of one or more standard fields.

76. The method of claim 75 wherein the identifier is stored in the packet in the form of a VLAN.

77. A system, associated with a network entity, for communicating proprietary control information over one or more backplane connections interconnecting one or more I/O blades and one or more management/switching (MSM) blades without functioning as a user interface, with the one or more backplane connections coupled to the one or more I/O blades through one or more backplane-side MAC controllers, and coupled to the one or more MSM blades through one or more back-plane-side MAC controllers, comprising:
   first means for mapping proprietary control information, comprising control information not generally recognized by network entities other than the network entity, for a packet into one or more identifiers of one or more of the one or more backplane connections;
   second means for storing the proprietary control information in a layer of the packet above the physical layer, wherein the proprietary control information as stored in the packet either replaces or appears in the packet to one or more other network entities as at least a portion of one or more standard packet fields; and
   third means for communicating the packet, including the proprietary control information, over the identified one or more backplane connections;
   wherein the first means derives at least a portion of the control information from a packet header, and deletes the packet header prior to communication of the packet over the one or more backplane connections, and wherein a second means re-creates at least a portion of the packet header from the control information after communication of the packet over the one or more backplane connections.

78. The system of claim 77 wherein the network entity comprise a switch, and the system further comprises means for extending the number of ports of the switch.

79. A method, performed in, by or for a network entity, of communicating proprietary control information over one or more backplane connections interconnecting one or more I/O blades with one or more management/switching (MSM) blades without functioning as a user interface, with the one or more backplane connections coupled to the one or more I/O blades through one or more backplane-side MAC controllers, and coupled to the one or more MSM blades through one or more backplane-side MAC controllers, comprising:
   a step for mapping proprietary control information, comprising control information recognized by the network entity but not generally recognized by other network entities, for a packet into one or more identifiers of at least one of the one or more backplane connections;
   a step for storing the proprietary control information in a layer of the packet above the physical layer, wherein the proprietary control information as stored in the packet either replaces or appears in the packet to one or more other network entities as at least a portion of one or more standard packet fields; and
   a step for communicating the packet, including the proprietary control information, over the at least one backplane connections identified by the one or more identifiers;

wherein at least a portion of the control information is derived from a packet header, and is deleted from the packet header prior to communication of the packet over the one or more backplane connections, and wherein at least a portion of the packet header from the control information is re-created after communication of the packet over the one or more backplane connections.

80. The method of claim 79 wherein the network entity comprise a switch, and the method further comprises a step for extending the number of ports of the switch.

81. The system of claim 1,
wherein at least one of the one or more I/O blades comprises one or more network-side MAC controllers coupled to switch fabric that in turn are coupled to one or more backplane-side MAC controllers; and
wherein at least one of the one or more MSM blades comprises one or more backplane MAC controllers coupled to one or more packet filtering and control engines that in turn are coupled to switch fabric that in turn is coupled to a microcontroller.

82. The system of claim 81 wherein the switching fabric for the at least one I/O blade stores a packet in a queue selected based upon equality of service information for the packet.

83. The system of claim 61,
wherein, when a packet is received at the first switch, the first logic:
determines whether the packet is an ingress packet or an egress packet;
when the packet is an ingress packet, the first logic inserts a VLAN into the MAC sub-layer of the packet, stores in the VLAN an identifier of an ingress port of the first switch at which the packet was received, and communicates the packet to the second switch; and
when the packet is an egress packet, the first logic retrieves from a VLAN in the MAC sub-layer of the packet an identifier of an egress port of the first switch from which the packet is to be transmitted over the network, and transmits the packet from the egress port of the first switch over the network;
wherein, when a packet is received at the second switch, the second logic:
determines whether the packet is an ingress packet or an egress packet;
when the packet is an ingress packet, the second logic retrieves from a VLAN in the MAC sub-layer of the packet an identifier of an ingress port of the first switch at which the packet was received over the network, copies or inserts the identifier into a header for or data element of the packet, and performs additional processing of the packet or transmits the packet to a management/switching (MSM) blade; and
wherein if when the packet is an egress packet, the second logic inserts a VLAN into the MAC sub-layer of the packet, stores in the VLAN an identifier of an egress port of the first switch from which the packet is to be transmitted over the network, and communicates the packet to the first switch.

84. A system of claim 1, further comprising a fourth logic that masks the control information such that the control information appears as a standard packet field to a third party.

85. The method of claim 69 further comprising:
when a packet is received at the first switch:
determining whether the packet is an ingress packet or an egress packet;
when the packet is an ingress packet, inserting a VLAN into the MAC sub-layer of the packet, storing in the VLAN an identifier of an ingress port of the first switch at which the packet was received, and communicating the packet to the second switch; and
when the packet is an egress packet, retrieving from a VLAN in the MAC sub-layer of the packet an identifier of an egress port of the first switch from which the packet is to be transmitted over the network, and transmitting the packet from the egress port of the first switch over the network;
when a packet is received at the second switch:
determining whether the packet is an ingress packet or an egress packet;
when the packet is an ingress packet, retrieving from a VLAN in the MAC sub-layer of the packet an identifier of an ingress port of the first switch at which the packet was received over the network, copying or inserting the identifier into a header for or data element of the packet, and performing additional processing of the packet or transmitting the packet to a management/switching (MSM) blade; and
when the packet is an egress packet, inserting a VLAN into the MAC sub-layer of the packet, storing in the VLAN an identifier of an egress port of the first switch from which the packet is to be transmitted over the network, and communicating the packet to the first switch.

86. The system of claim 83 wherein the first logic, when an egress packet is received at the first switch, deletes the VLAN containing the egress port identifier from the packet before transmitting the packet over the network.

87. The system of claim 83 wherein the second logic, when an ingress packet is received at the second switch, deletes the VLAN containing the ingress port identifier from the packet after copying or inserting the identifier into a header for the packet.

88. The method of claim 85 wherein, when an egress packet is received at the first switch, the VLAN containing the egress port identifier is deleted from the packet before transmitting the packet over the network.

89. The method of claim 85 wherein, when an ingress packet is received at the second switch, the VLAN containing the ingress port identifier is deleted from the packet after the identifier is copied or inserted into a header for the packet.

90. The system of claim 83 wherein the identifier is copied or inserted into a header pre-pended to the packet.

91. The system of claim 83 wherein the identifier is copied or inserted into a data element within the MAC sub-layer of the packet.

92. The method of claim 85 wherein the identifier is copied or inserted into a header pre-pended to the packet.

93. The method of claim 85 wherein the identifier is copied or inserted into a data element within the MAC sub-layer of the packet.

* * * * *

UNITED STATES PATENT AND TRADEMARK OFFICE
CERTIFICATE OF CORRECTION

PATENT NO. : 7,580,409 B1
APPLICATION NO. : 10/658216
DATED : August 25, 2009
INVENTOR(S) : Swenson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1116 days.

Signed and Sealed this

Fourteenth Day of September, 2010

David J. Kappos
*Director of the United States Patent and Trademark Office*